United States Patent
Doraiswamy et al.

(10) Patent No.: US 11,002,123 B2
(45) Date of Patent: May 11, 2021

(54) THERMAL RECOVERY METHODS FOR RECOVERING VISCOUS HYDROCARBONS FROM A SUBTERRANEAN FORMATION

(71) Applicants: Sriram Doraiswamy, Spring, TX (US); Rahman Khaledi, Calgary (CA); Robert D. Kaminsky, Houston, TX (US)

(72) Inventors: Sriram Doraiswamy, Spring, TX (US); Rahman Khaledi, Calgary (CA); Robert D. Kaminsky, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 216 days.

(21) Appl. No.: 16/040,669

(22) Filed: Jul. 20, 2018

(65) Prior Publication Data
US 2019/0063199 A1 Feb. 28, 2019

(30) Foreign Application Priority Data
Aug. 31, 2017 (CA) .................................. CA 2978157

(51) Int. Cl.
*E21B 43/24* (2006.01)
*C09K 8/592* (2006.01)

(52) U.S. Cl.
CPC .............. *E21B 43/24* (2013.01); *C09K 8/592* (2013.01); *E21B 43/2408* (2013.01)

(58) Field of Classification Search
CPC ................................ E21B 43/24; C09K 8/592
(Continued)

(56) References Cited

U.S. PATENT DOCUMENTS

| 1,422,204 A | 7/1922 | Hoover et al. |
| 1,491,138 A | 4/1924 | Hixon |

(Continued)

FOREIGN PATENT DOCUMENTS

| CA | 0603924 A | 8/1960 |
| CA | 0836325 A | 3/1970 |

(Continued)

OTHER PUBLICATIONS

Ai-Gosayier, M., et al. (2015) "In Situ Recovery of Heavy-Oil From Fractured Carbonate Reservoirs: Optimization of Steam-Over-Solvent Injection Method" *Journal of Petroleum Science and Engineering*, vol. 130, pp. 77-85.

(Continued)

*Primary Examiner* — Zakiya W Bates
*Assistant Examiner* — Ashish K Varma
(74) *Attorney, Agent, or Firm* — ExxonMobil Upstream Research Company—Law Department

(57) ABSTRACT

Thermal recovery methods for recovering viscous hydrocarbons from a subterranean formation. The thermal recovery methods include performing a plurality of injection cycles. Each injection cycle in the plurality of injection cycles includes injecting a heated solvent vapor stream into a heated chamber that extends within the subterranean formation and fluidly contacting the viscous hydrocarbons with the heated solvent vapor stream to generate mobilized viscous hydrocarbons. Each injection cycle also includes injecting a steam stream into the heated chamber. The thermal recovery methods further include producing a chamber liquid and/or mobilized viscous hydrocarbons from the subterranean formation.

23 Claims, 5 Drawing Sheets

(58) Field of Classification Search
USPC .................................................. 166/272.7
See application file for complete search history.

(56) References Cited

U.S. PATENT DOCUMENTS

| | | |
|---|---|---|
| 2,365,591 A | 12/1944 | Ranney |
| 2,412,765 A | 12/1946 | Buddrus |
| 2,813,583 A | 11/1957 | Marx et al. |
| 2,859,818 A | 11/1958 | Hall et al. |
| 2,862,558 A | 12/1958 | Dixon |
| 2,910,123 A | 1/1959 | Elkins et al. |
| 2,876,838 A | 3/1959 | Williams |
| 2,881,838 A | 4/1959 | Morse et al. |
| 2,909,224 A | 10/1959 | Allen |
| 3,126,961 A | 3/1964 | Craig, Jr. et al. |
| 3,156,299 A | 11/1964 | Trantham |
| 3,163,215 A | 12/1964 | Stratton |
| 3,174,544 A | 3/1965 | Campion et al. |
| 3,182,722 A | 5/1965 | Reed |
| 3,205,944 A | 9/1965 | Walton |
| 3,221,809 A | 12/1965 | Walton |
| 3,232,345 A | 2/1966 | Trantham et al. |
| 3,237,689 A | 3/1966 | Justheim |
| 3,246,693 A | 4/1966 | Crider |
| 3,280,909 A | 10/1966 | Closmann et al. |
| 3,294,167 A | 12/1966 | Vogel |
| 3,310,109 A | 3/1967 | Marx et al. |
| 3,314,476 A | 4/1967 | Staples et al. |
| 3,315,745 A | 4/1967 | Rees, Jr. |
| 3,322,194 A | 5/1967 | Strubbar |
| 3,332,482 A | 7/1967 | Trantham |
| 3,333,632 A | 8/1967 | Kyte |
| 3,334,687 A | 8/1967 | Parker |
| 3,342,257 A | 9/1967 | Jacobs et al. |
| 3,342,259 A | 9/1967 | Powell |
| 3,347,313 A | 10/1967 | Matthews et al. |
| 3,349,845 A | 10/1967 | Holbert et al. |
| 3,351,132 A | 11/1967 | Dougan et al. |
| 3,361,201 A | 1/1968 | Howard |
| 3,363,686 A | 1/1968 | Gilchrist |
| 3,363,687 A | 1/1968 | Dean |
| 3,373,804 A | 3/1968 | Glass et al. |
| 3,379,246 A | 4/1968 | Skylar et al. |
| 3,379,248 A | 4/1968 | Strange |
| 3,406,755 A | 10/1968 | Sharp |
| 3,411,578 A | 11/1968 | Holmes |
| 3,412,793 A | 11/1968 | Needham |
| 3,412,794 A | 11/1968 | Craighead |
| 3,422,891 A | 1/1969 | Alexander et al. |
| 3,430,700 A | 3/1969 | Satter et al. |
| 3,441,083 A | 4/1969 | Fitzgerald |
| 3,454,095 A | 7/1969 | Messenger et al. |
| 3,454,958 A | 7/1969 | Parker |
| 3,456,721 A | 7/1969 | Smith |
| 3,490,529 A | 1/1970 | Parker |
| 3,490,531 A | 1/1970 | Dixon |
| 3,507,330 A | 4/1970 | Gill |
| 3,547,192 A | 12/1970 | Claridge et al. |
| 3,554,285 A | 1/1971 | Meldau |
| 3,572,436 A | 3/1971 | Riehl |
| 3,605,888 A | 9/1971 | Crowson et al. |
| 3,608,638 A | 9/1971 | Terwiltiger |
| 3,653,438 A | 4/1972 | Wagner |
| 3,685,581 A | 8/1972 | Hess et al. |
| 3,690,376 A | 9/1972 | Zwicky et al. |
| 3,703,927 A | 11/1972 | Harry |
| 3,705,625 A | 12/1972 | Whitten et al. |
| 3,724,043 A | 4/1973 | Eustance |
| 3,727,686 A | 4/1973 | Prates et al. |
| 3,759,328 A | 9/1973 | Ueber et al. |
| 3,768,559 A | 10/1973 | Allen et al. |
| 3,771,598 A | 11/1973 | McBean |
| 3,782,465 A | 1/1974 | Bell et al. |
| 3,782,472 A | 1/1974 | Siess, Jr. |
| 3,796,262 A | 3/1974 | Allen et al. |
| 3,804,169 A | 4/1974 | Closmann |
| 3,805,885 A | 4/1974 | Van Huisen |
| 3,822,747 A | 7/1974 | Maguire, Jr. |
| 3,822,748 A | 7/1974 | Allen et al. |
| 3,823,777 A | 7/1974 | Allen et al. |
| 3,827,495 A | 8/1974 | Reed |
| 3,837,399 A | 9/1974 | Allen et al. |
| 3,837,402 A | 9/1974 | Stringer |
| 3,838,738 A | 10/1974 | Redford et al. |
| 3,847,219 A | 11/1974 | Wang et al. |
| 3,847,224 A | 11/1974 | Allen et al. |
| 3,872,924 A | 3/1975 | Clampitt |
| 3,881,550 A | 5/1975 | Barry |
| 3,882,941 A | 5/1975 | Pelofsky |
| 3,892,270 A | 7/1975 | Lindquist |
| 3,905,422 A | 9/1975 | Woodward |
| 3,913,671 A | 10/1975 | Redford et al. |
| 3,929,190 A | 12/1975 | Chang et al. |
| 3,931,856 A | 1/1976 | Barnes |
| 3,941,192 A | 3/1976 | Carlin et al. |
| 3,945,436 A | 3/1976 | Barry |
| 3,945,679 A | 3/1976 | Clossmann et al. |
| 3,946,809 A | 3/1976 | Hagedorn |
| 3,946,810 A | 3/1976 | Barry |
| 3,954,139 A | 5/1976 | Allen |
| 3,954,141 A | 5/1976 | Allen et al. |
| 3,958,636 A | 5/1976 | Perkins |
| 3,964,546 A | 6/1976 | Allen |
| 3,964,547 A | 6/1976 | Hujsak et al. |
| 3,967,853 A | 7/1976 | Closmann et al. |
| 3,978,920 A | 9/1976 | Bandyopadhyay et al. |
| 3,983,939 A | 10/1976 | Brown et al. |
| 3,993,133 A | 11/1976 | Clampitt |
| 3,994,341 A | 11/1976 | Anderson et al. |
| 3,997,004 A | 12/1976 | Wu |
| 3,999,606 A | 12/1976 | Bandyopadhyay et al. |
| 4,003,432 A | 1/1977 | Paull et al. |
| 4,004,636 A | 1/1977 | Brown et al. |
| 4,007,785 A | 2/1977 | Allen et al. |
| 4,007,791 A | 2/1977 | Johnson |
| 4,008,764 A | 2/1977 | Allen |
| 4,008,765 A | 2/1977 | Anderson et al. |
| 4,019,575 A | 4/1977 | Pisio et al. |
| 4,019,578 A | 4/1977 | Terry et al. |
| 4,020,901 A | 5/1977 | Pisio et al. |
| 4,022,275 A | 5/1977 | Brandon |
| 4,022,277 A | 5/1977 | Routson |
| 4,022,279 A | 5/1977 | Driver |
| 4,022,280 A | 5/1977 | Stoddard et al. |
| 4,026,358 A | 5/1977 | Allen |
| 4,033,411 A | 7/1977 | Goins |
| 4,037,655 A | 7/1977 | Carpenter |
| 4,037,658 A | 7/1977 | Anderson |
| 4,049,053 A | 9/1977 | Fisher et al. |
| 4,066,127 A | 1/1978 | Harnsberger |
| 4,067,391 A | 1/1978 | Dewell |
| 4,068,715 A | 1/1978 | Wu |
| 4,068,717 A | 1/1978 | Needham |
| 4,078,608 A | 3/1978 | Allen et al. |
| 4,079,585 A | 3/1978 | Helleur |
| 4,084,637 A | 4/1978 | Todd |
| 4,085,799 A | 4/1978 | Bousaid et al. |
| 4,085,800 A | 4/1978 | Engle et al. |
| 4,085,803 A | 4/1978 | Butler |
| 4,088,188 A | 5/1978 | Widmyer |
| 4,099,564 A | 7/1978 | Hutchinson |
| 4,099,568 A | 7/1978 | Allen |
| 4,109,720 A | 8/1978 | Allen et al. |
| 4,114,687 A | 9/1978 | Payton |
| 4,114,691 A | 9/1978 | Payton |
| 4,116,275 A | 9/1978 | Butler et al. |
| 4,119,149 A | 10/1978 | Wu et al. |
| 4,120,357 A | 10/1978 | Anderson |
| 4,124,071 A | 11/1978 | Allen et al. |
| 4,124,074 A | 11/1978 | Allen et al. |
| 4,127,170 A | 11/1978 | Redford |
| 4,129,183 A | 12/1978 | Kalfoglou |
| 4,129,308 A | 12/1978 | Hutchinson |
| 4,130,163 A | 12/1978 | Bombardieri |

(56) References Cited

U.S. PATENT DOCUMENTS

| | | |
|---|---|---|
| 4,133,382 A | 1/1979 | Cram et al. |
| 4,133,384 A | 1/1979 | Allen et al. |
| 4,140,180 A | 2/1979 | Bridges et al. |
| 4,140,182 A | 2/1979 | Vriend |
| 4,141,415 A | 2/1979 | Wu et al. |
| 4,144,935 A | 3/1979 | Bridges et al. |
| RE30,019 E | 6/1979 | Lindquist |
| 4,160,479 A | 7/1979 | Richardson et al. |
| 4,160,481 A | 7/1979 | Turk et al. |
| 4,166,503 A | 9/1979 | Hall et al. |
| 4,174,752 A | 11/1979 | Slater et al. |
| 4,175,618 A | 11/1979 | Wu et al. |
| 4,191,252 A | 3/1980 | Buckley et al. |
| 4,202,168 A | 5/1980 | Acheson et al. |
| 4,202,169 A | 5/1980 | Acheson et al. |
| 4,207,945 A | 6/1980 | Hall et al. |
| 4,212,353 A | 7/1980 | Hall |
| 4,217,956 A | 8/1980 | Goss et al. |
| 4,223,728 A | 9/1980 | Pegg |
| 4,228,853 A | 10/1980 | Harvey et al. |
| 4,228,854 A | 10/1980 | Sacuta |
| 4,228,856 A | 10/1980 | Reale |
| 4,246,966 A | 1/1981 | Stoddard et al. |
| 4,248,302 A | 2/1981 | Churchman |
| 4,249,602 A | 2/1981 | Burton, III et al. |
| 4,250,964 A | 2/1981 | Jewell et al. |
| 4,252,194 A | 2/1981 | Felber et al. |
| 4,260,018 A | 4/1981 | Shum et al. |
| 4,262,745 A | 4/1981 | Stewart |
| 4,265,310 A | 5/1981 | Britton et al. |
| 4,270,609 A | 6/1981 | Choules |
| 4,271,905 A | 6/1981 | Redford et al. |
| 4,274,487 A | 6/1981 | Hollingsworth et al. |
| 4,280,559 A | 7/1981 | Best |
| 4,282,929 A | 8/1981 | Krajicek |
| 4,284,139 A | 8/1981 | Sweany |
| RE30,738 E | 9/1981 | Bridges et al. |
| 4,289,203 A | 9/1981 | Swanson |
| 4,295,980 A | 10/1981 | Motz |
| 4,296,814 A | 10/1981 | Stalder et al. |
| 4,300,634 A | 11/1981 | Clampitt |
| 4,303,126 A | 12/1981 | Blevins |
| 4,305,463 A | 12/1981 | Zakiewicz |
| 4,306,981 A | 12/1981 | Blair, Jr. |
| 4,319,632 A | 3/1982 | Marr, Jr. |
| 4,319,635 A | 3/1982 | Jones |
| 4,324,291 A | 4/1982 | Wong et al. |
| 4,325,432 A | 4/1982 | Henry |
| 4,326,968 A | 4/1982 | Blair, Jr. |
| 4,327,805 A | 5/1982 | Poston |
| 4,330,038 A | 5/1982 | Soukup et al. |
| 4,333,529 A | 6/1982 | McCorquodale |
| 4,344,483 A | 8/1982 | Fisher et al. |
| 4,344,485 A | 8/1982 | Butler |
| 4,344,486 A | 8/1982 | Parrish |
| 4,345,652 A | 8/1982 | Roque |
| 4,362,213 A | 12/1982 | Tabor |
| 4,372,385 A | 2/1983 | Rhoades et al. |
| 4,372,386 A | 2/1983 | Rhoades et al. |
| 4,379,489 A | 4/1983 | Rollmann |
| 4,379,592 A | 4/1983 | Vakhnin et al. |
| 4,380,265 A | 4/1983 | Mohaupt |
| 4,380,267 A | 4/1983 | Fox |
| 4,381,124 A | 4/1983 | Verty et al. |
| 4,382,469 A | 5/1983 | Bell et al. |
| 4,385,661 A | 5/1983 | Fox |
| 4,387,016 A | 6/1983 | Gagon |
| 4,389,320 A | 6/1983 | Clampitt |
| 4,390,062 A | 6/1983 | Fox |
| 4,390,067 A | 6/1983 | William |
| 4,392,530 A | 7/1983 | Odeh et al. |
| 4,393,937 A | 7/1983 | Dilgren et al. |
| 4,396,063 A | 8/1983 | Godbey |
| 4,398,602 A | 8/1983 | Anderson |
| 4,398,692 A | 8/1983 | Macfie |
| 4,406,499 A | 9/1983 | Yildirim |
| 4,407,367 A | 10/1983 | Kydd |
| 4,410,216 A | 10/1983 | Allen |
| 4,411,618 A | 10/1983 | Donaldson et al. |
| 4,412,585 A | 11/1983 | Bouck |
| 4,415,034 A | 11/1983 | Bouck |
| 4,417,620 A | 11/1983 | Shafir |
| 4,418,752 A | 12/1983 | Boyer et al. |
| 4,423,779 A | 1/1984 | Livingston |
| 4,427,528 A | 1/1984 | Lindörfer et al. |
| 4,429,744 A | 2/1984 | Cook |
| 4,429,745 A | 2/1984 | Cook |
| 4,431,056 A | 2/1984 | Shu |
| 4,434,851 A | 3/1984 | Haynes, Jr. et al. |
| 4,441,555 A | 4/1984 | Shu |
| 4,444,257 A | 4/1984 | Stine |
| 4,444,261 A | 4/1984 | Islip |
| 4,445,573 A | 5/1984 | McCaleb |
| 4,448,251 A | 5/1984 | Stine |
| 4,450,909 A | 5/1984 | Sacuta |
| 4,450,911 A | 5/1984 | Seglin et al. |
| 4,450,913 A | 5/1984 | Allen et al. |
| 4,452,491 A | 6/1984 | Seglin et al. |
| 4,453,597 A | 6/1984 | Brown et al. |
| 4,456,065 A | 6/1984 | Heim et al. |
| 4,456,066 A | 6/1984 | Shu |
| 4,456,068 A | 6/1984 | Burrill, Jr. et al. |
| 4,458,756 A | 7/1984 | Clark |
| 4,458,759 A | 7/1984 | Isaacs et al. |
| 4,460,044 A | 7/1984 | Porter |
| 4,465,137 A | 8/1984 | Sustek, Jr. et al. |
| 4,466,485 A | 8/1984 | Shu |
| 4,469,177 A | 9/1984 | Venkatesan |
| 4,471,839 A | 9/1984 | Snavely et al. |
| 4,473,114 A | 9/1984 | Bell et al. |
| 4,475,592 A | 10/1984 | Pachovsky |
| 4,475,595 A | 10/1984 | Watkins et al. |
| 4,478,280 A | 10/1984 | Hopkins et al. |
| 4,478,705 A | 10/1984 | Ganguli |
| 4,480,689 A | 11/1984 | Wunderlich |
| 4,484,630 A | 11/1984 | Chung |
| 4,485,868 A | 12/1984 | Sresty et al. |
| 4,487,262 A | 12/1984 | Venkatesan et al. |
| 4,487,264 A | 12/1984 | Hyne et al. |
| 4,488,600 A | 12/1984 | Fan |
| 4,488,976 A | 12/1984 | Dilgren et al. |
| 4,491,180 A | 1/1985 | Brown et al. |
| 4,495,994 A | 1/1985 | Brown et al. |
| 4,498,537 A | 2/1985 | Cook |
| 4,498,542 A | 2/1985 | Eisenhawer et al. |
| 4,499,946 A | 2/1985 | Martin et al. |
| 4,501,325 A | 2/1985 | Frazier et al. |
| 4,501,326 A | 2/1985 | Edmunds |
| 4,501,445 A | 2/1985 | Gregoli |
| 4,503,910 A | 3/1985 | Shu |
| 4,503,911 A | 3/1985 | Harman et al. |
| 4,508,170 A | 4/1985 | Littmann |
| 4,513,819 A | 4/1985 | Islip et al. |
| 4,515,215 A | 5/1985 | Hermes et al. |
| 4,516,636 A | 5/1985 | Doscher |
| 4,522,260 A | 6/1985 | Wolcott, Jr. |
| 4,522,263 A | 6/1985 | Hopkins et al. |
| 4,524,826 A | 6/1985 | Savage |
| 4,527,650 A | 7/1985 | Bartholet |
| 4,528,104 A | 7/1985 | House et al. |
| 4,530,401 A | 7/1985 | Hartman et al. |
| 4,532,993 A | 8/1985 | Dilgren et al. |
| 4,532,994 A | 8/1985 | Toma et al. |
| 4,535,845 A | 8/1985 | Brown et al. |
| 4,540,049 A | 9/1985 | Hawkins et al. |
| 4,540,050 A | 9/1985 | Huang et al. |
| 4,545,435 A | 10/1985 | Bridges et al. |
| 4,546,829 A | 10/1985 | Martin et al. |
| 4,550,779 A | 11/1985 | Zakiewicz |
| 4,556,107 A | 12/1985 | Duerksen et al. |
| 4,558,740 A | 12/1985 | Yellig, Jr. |
| 4,565,245 A | 1/1986 | Mims et al. |
| 4,565,249 A | 1/1986 | Pebdani et al. |
| 4,572,296 A | 2/1986 | Watkins |

(56) References Cited

U.S. PATENT DOCUMENTS

| | | |
|---|---|---|
| 4,574,884 A | 3/1986 | Schmidt |
| 4,574,886 A | 3/1986 | Hopkins et al. |
| 4,577,688 A | 3/1986 | Gassmann et al. |
| 4,579,176 A | 4/1986 | Davies et al. |
| 4,589,487 A | 5/1986 | Venkatesan et al. |
| 4,595,057 A | 6/1986 | Deming et al. |
| 4,597,441 A | 7/1986 | Ware et al. |
| 4,597,443 A | 7/1986 | Shu et al. |
| 4,598,770 A | 7/1986 | Shu et al. |
| 4,601,337 A | 7/1986 | Lau et al. |
| 4,601,338 A | 7/1986 | Prats et al. |
| 4,607,695 A | 8/1986 | Weber |
| 4,607,699 A | 8/1986 | Stephens |
| 4,607,700 A | 8/1986 | Duerksen et al. |
| 4,610,304 A | 9/1986 | Doscher |
| 4,612,989 A | 9/1986 | Rakach et al. |
| 4,612,990 A | 9/1986 | Shu |
| 4,615,391 A | 10/1986 | Garthoffner |
| 4,620,592 A | 11/1986 | Perkins |
| 4,620,593 A | 11/1986 | Haagensen |
| 4,635,720 A | 1/1987 | Chew |
| 4,637,461 A | 1/1987 | Hight |
| 4,637,466 A | 1/1987 | Hawkins et al. |
| 4,640,352 A | 2/1987 | Vanmeurs et al. |
| 4,640,359 A | 2/1987 | Livesey et al. |
| 4,641,710 A | 2/1987 | Klinger |
| 4,645,003 A | 2/1987 | Huang et al. |
| 4,645,004 A | 2/1987 | Bridges et al. |
| 4,646,824 A | 3/1987 | Huang et al. |
| 4,648,835 A | 3/1987 | Esienhawer et al. |
| 4,651,825 A | 3/1987 | Wilson |
| 4,651,826 A | 3/1987 | Holmes |
| 4,653,583 A | 3/1987 | Huang et al. |
| 4,662,438 A | 5/1987 | Taflove et al. |
| 4,662,440 A | 5/1987 | Harmon et al. |
| 4,662,441 A | 5/1987 | Huang et al. |
| 4,665,035 A | 5/1987 | Tunac |
| 4,665,989 A | 5/1987 | Wilson |
| 4,667,739 A | 5/1987 | Van Meurs et al. |
| 4,679,626 A | 7/1987 | Perkins |
| 4,682,652 A | 7/1987 | Huang et al. |
| 4,682,653 A | 7/1987 | Angstadt |
| 4,685,515 A | 8/1987 | Huang et al. |
| 4,687,058 A | 8/1987 | Casad et al. |
| 4,690,215 A | 9/1987 | Roberts et al. |
| 4,691,773 A | 9/1987 | Ward et al. |
| 4,694,907 A | 9/1987 | Stahl et al. |
| 4,696,311 A | 9/1987 | Muiis et al. |
| 4,697,642 A | 10/1987 | Vogel |
| 4,699,213 A | 10/1987 | Fleming |
| 4,700,779 A | 10/1987 | Huang et al. |
| 4,702,314 A | 10/1987 | Huang et al. |
| 4,702,317 A | 10/1987 | Shen |
| 4,705,108 A | 11/1987 | Little et al. |
| 4,706,751 A | 11/1987 | Gondouin |
| 4,707,230 A | 11/1987 | Ajami |
| 4,718,485 A | 1/1988 | Brown et al. |
| 4,718,489 A | 1/1988 | Hallam et al. |
| 4,727,489 A | 2/1988 | Frazier et al. |
| 4,727,937 A | 3/1988 | Shum et al. |
| 4,739,831 A | 4/1988 | Settlemeyer et al. |
| 4,753,293 A | 6/1988 | Bohn |
| 4,756,369 A | 7/1988 | Jennings, Jr. et al. |
| 4,757,833 A | 7/1988 | Danley |
| 4,759,571 A | 7/1988 | Stone et al. |
| 4,766,958 A | 8/1988 | Faecke |
| 4,769,161 A | 9/1988 | Angstadt |
| 4,775,450 A | 10/1988 | Ajami |
| 4,782,901 A | 11/1988 | Phelps et al. |
| 4,785,028 A | 11/1988 | Hoskin et al. |
| 4,785,883 A | 11/1988 | Hoskin et al. |
| 4,787,452 A | 11/1988 | Jennings, Jr. |
| 4,793,409 A | 12/1988 | Bridges et al. |
| 4,793,415 A | 12/1988 | Holmes et al. |
| 4,804,043 A | 2/1989 | Shu et al. |
| 4,809,780 A | 3/1989 | Shen |
| 4,813,483 A | 3/1989 | Ziegler |
| 4,817,711 A | 4/1989 | Jeambey |
| 4,817,714 A | 4/1989 | Jones |
| 4,818,370 A | 4/1989 | Gregoli et al. |
| 4,819,724 A | 4/1989 | Bou-Mikael |
| 4,828,030 A | 5/1989 | Jennings, Jr. |
| 4,828,031 A | 5/1989 | Davis |
| 4,828,032 A | 5/1989 | Telezke et al. |
| 4,834,174 A | 5/1989 | Vandevier |
| 4,834,179 A | 5/1989 | Kokolis et al. |
| 4,844,155 A | 7/1989 | Megyeri et al. |
| 4,846,275 A | 7/1989 | McKay |
| 4,850,429 A | 7/1989 | Mims et al. |
| 4,856,587 A | 8/1989 | Nielson |
| 4,856,856 A | 8/1989 | Phelps et al. |
| 4,860,827 A | 8/1989 | Lee et al. |
| 4,861,263 A | 8/1989 | Schirmer |
| 4,867,238 A | 9/1989 | Bayless et al. |
| 4,869,830 A | 9/1989 | Konak et al. |
| 4,874,043 A | 10/1989 | Joseph et al. |
| 4,877,542 A | 10/1989 | Lon et al. |
| 4,884,155 A | 11/1989 | Spash |
| 4,884,635 A | 12/1989 | McKay et al. |
| 4,886,118 A | 12/1989 | Van Meurs et al. |
| 4,892,146 A | 1/1990 | Shen |
| 4,895,085 A | 1/1990 | Chips |
| 4,895,206 A | 1/1990 | Price |
| 4,896,725 A | 1/1990 | Parker et al. |
| 4,901,795 A | 2/1990 | Phelps et al. |
| 4,903,766 A | 2/1990 | Shu |
| 4,903,768 A | 2/1990 | Shu |
| 4,903,770 A | 2/1990 | Friedeman et al. |
| 4,915,170 A | 4/1990 | Hoskin |
| 4,919,206 A | 4/1990 | Freeman et al. |
| 4,926,941 A | 5/1990 | Glandt et al. |
| 4,926,943 A | 5/1990 | Hoskin |
| 4,928,766 A | 5/1990 | Hoskin |
| 4,930,454 A | 6/1990 | Latty et al. |
| 4,940,091 A | 7/1990 | Shu et al. |
| 4,945,984 A | 8/1990 | Price |
| 4,947,933 A | 8/1990 | Jones et al. |
| 4,961,467 A | 10/1990 | Pebdani |
| 4,962,814 A | 10/1990 | Alameddine |
| 4,964,461 A | 10/1990 | Shu |
| 4,966,235 A | 10/1990 | Gregoli et al. |
| 4,969,520 A | 11/1990 | Jan et al. |
| 4,974,677 A | 12/1990 | Shu |
| 4,982,786 A | 1/1991 | Jennings, Jr. |
| 4,983,364 A | 1/1991 | Buck et al. |
| 4,991,652 A | 2/1991 | Hoskin et al. |
| 5,010,953 A | 4/1991 | Friedman et al. |
| 5,013,462 A | 5/1991 | Danley |
| 5,014,787 A | 5/1991 | Duerksen |
| 5,016,709 A | 5/1991 | Combe et al. |
| 5,016,710 A | 5/1991 | Renard et al. |
| 5,016,713 A | 5/1991 | Sanchez et al. |
| 5,024,275 A | 6/1991 | Anderson et al. |
| 5,025,863 A | 6/1991 | Haines |
| 5,027,898 A | 7/1991 | Naae |
| 5,036,915 A | 8/1991 | Wyganowski |
| 5,036,917 A | 8/1991 | Jennings, Jr. et al. |
| 5,036,918 A | 8/1991 | Jennings, Jr. et al. |
| 5,040,605 A | 8/1991 | Showalter |
| 5,042,579 A | 8/1991 | Glandt et al. |
| 5,046,559 A | 9/1991 | Glandt |
| 5,046,560 A | 9/1991 | Teletzke et al. |
| 5,052,482 A | 10/1991 | Gondouin |
| 5,054,551 A | 10/1991 | Duerksen |
| 5,056,596 A | 10/1991 | McKay et al. |
| 5,058,681 A | 10/1991 | Reed |
| 5,060,726 A | 10/1991 | Glandt et al. |
| 5,065,819 A | 11/1991 | Kasevich |
| 5,083,612 A | 1/1992 | Ashrawi |
| 5,083,613 A | 1/1992 | Gregoli et al. |
| 5,085,275 A | 2/1992 | Gondouin |
| 5,095,984 A | 3/1992 | Irani |
| 5,099,918 A | 3/1992 | Bridges et al. |
| 5,101,898 A | 4/1992 | Hong |

(56) References Cited

U.S. PATENT DOCUMENTS

| | | |
|---|---|---|
| 5,105,880 A | 4/1992 | Shen |
| 5,109,927 A | 5/1992 | Supernaw et al. |
| 5,123,485 A | 6/1992 | Vasicek et al. |
| 5,131,471 A | 7/1992 | Duerksen et al. |
| 5,145,002 A | 9/1992 | McKay |
| 5,145,003 A | 9/1992 | Duerksen |
| 5,148,869 A | 9/1992 | Sanchez |
| 5,152,341 A | 10/1992 | Kasevich et al. |
| 5,156,214 A | 10/1992 | Hoskin et al. |
| 5,167,280 A | 12/1992 | Sanchez et al. |
| 5,172,763 A | 12/1992 | Mohammadi et al. |
| 5,174,377 A | 12/1992 | Kumar |
| 5,178,217 A | 1/1993 | Mohammadi et al. |
| 5,186,256 A | 2/1993 | Downs |
| 5,197,541 A | 3/1993 | Hess et al. |
| 5,199,488 A | 4/1993 | Kasevich et al. |
| 5,199,490 A | 4/1993 | Surles et al. |
| 5,201,815 A | 4/1993 | Hong et al. |
| 5,215,146 A | 6/1993 | Sanchez |
| 5,215,149 A | 6/1993 | Lu |
| 5,236,039 A | 8/1993 | Edelstein et al. |
| 5,238,066 A | 8/1993 | Beattie et al. |
| 5,246,071 A | 9/1993 | Chu |
| 5,247,993 A | 9/1993 | Sarem et al. |
| 5,252,226 A | 10/1993 | Justice |
| 5,271,693 A | 12/1993 | Johnson et al. |
| 5,273,111 A | 12/1993 | Brannan et al. |
| 5,277,830 A | 1/1994 | Hoskin et al. |
| 5,279,367 A | 1/1994 | Osterloh |
| 5,282,508 A | 2/1994 | Ellingsen et al. |
| 5,289,881 A | 3/1994 | Schuh |
| 5,293,936 A | 3/1994 | Bridges |
| 5,295,540 A | 3/1994 | Djabbarah et al. |
| 5,297,627 A | 3/1994 | Sanchez et al. |
| 5,305,829 A | 4/1994 | Kumar |
| 5,318,124 A | 6/1994 | Ong et al. |
| 5,325,918 A | 7/1994 | Berryman et al. |
| 5,339,897 A | 8/1994 | Leaute |
| 5,339,898 A | 8/1994 | Yu et al. |
| 5,339,904 A | 8/1994 | Jennings, Jr. et al. |
| 5,350,014 A | 9/1994 | McKay |
| 5,358,054 A | 10/1994 | Bert |
| 5,361,845 A | 11/1994 | Jamaluddin et al. |
| 5,377,757 A | 1/1995 | Ng |
| 5,404,950 A | 4/1995 | Ng et al. |
| 5,407,009 A | 4/1995 | Butler et al. |
| 5,411,086 A | 5/1995 | Burcham et al. |
| 5,411,089 A | 5/1995 | Vinegar et al. |
| 5,411,094 A | 5/1995 | Northrop |
| 5,413,175 A | 5/1995 | Edmunds |
| 5,414,231 A | 5/1995 | Sato et al. |
| 5,417,283 A | 5/1995 | Ejiogu et al. |
| 5,431,224 A | 7/1995 | Laali |
| 5,433,271 A | 7/1995 | Vinegar et al. |
| 5,449,038 A | 9/1995 | Horton et al. |
| 5,450,902 A | 9/1995 | Mathews |
| 5,456,315 A | 10/1995 | Kinsman et al. |
| 5,458,193 A | 10/1995 | Horton et al. |
| 5,483,801 A | 1/1996 | Craze |
| 5,503,226 A | 4/1996 | Wadleigh |
| 5,511,616 A | 4/1996 | Bert |
| 5,513,705 A | 5/1996 | Djabbarah et al. |
| 5,531,272 A | 7/1996 | Ng et al. |
| 5,534,186 A | 7/1996 | Walker et al. |
| 5,542,474 A | 8/1996 | Djabbarah et al. |
| 5,547,022 A | 8/1996 | Juprasert et al. |
| 5,553,974 A | 9/1996 | Nazarian |
| 5,560,737 A | 10/1996 | Schuring et al. |
| 5,565,139 A | 10/1996 | Walker et al. |
| 5,589,775 A | 12/1996 | Kuckes |
| 5,607,016 A | 3/1997 | Butler |
| 5,607,018 A | 3/1997 | Schuh |
| 5,626,191 A | 5/1997 | Greaves et al. |
| 5,626,193 A | 5/1997 | Nzekwu et al. |
| 5,635,139 A | 6/1997 | Holst et al. |
| 5,646,309 A | 7/1997 | Hammarberg et al. |
| 5,650,128 A | 7/1997 | Holst et al. |
| 5,660,500 A | 8/1997 | Marsden, Jr. et al. |
| 5,674,816 A | 10/1997 | Loree |
| 5,677,267 A | 10/1997 | Suarez et al. |
| 5,682,613 A | 11/1997 | Dinatale |
| 5,685,371 A | 11/1997 | Richardson et al. |
| 5,691,906 A | 11/1997 | Togashi et al. |
| 5,709,505 A | 1/1998 | Williams et al. |
| 5,713,415 A | 2/1998 | Bridges |
| 5,720,350 A | 2/1998 | McGuire |
| 5,725,054 A | 3/1998 | Shayegi |
| 5,738,937 A | 4/1998 | Baychar |
| 5,765,964 A | 6/1998 | Calcote et al. |
| 5,771,973 A | 6/1998 | Jensen |
| 5,788,412 A | 8/1998 | Jatkar |
| RE35,891 E | 9/1998 | Jamaluddin et al. |
| 5,803,171 A | 9/1998 | McCaffery et al. |
| 5,803,178 A | 9/1998 | Cain |
| 5,813,799 A | 9/1998 | Calcote et al. |
| 5,823,631 A | 10/1998 | Herbolzheimer et al. |
| 5,826,656 A | 10/1998 | McGuire et al. |
| 5,860,475 A | 1/1999 | Ejiogu et al. |
| 5,899,274 A | 5/1999 | Frauenfeld et al. |
| 5,923,170 A | 7/1999 | Kuckes |
| 5,931,230 A | 8/1999 | Lesage et al. |
| 5,941,081 A | 8/1999 | Burgener |
| 5,957,202 A | 9/1999 | Huang |
| 5,984,010 A | 11/1999 | Elias et al. |
| 6,000,471 A | 12/1999 | Langset |
| 6,004,451 A | 12/1999 | Rock et al. |
| 6,012,520 A | 1/2000 | Yu et al. |
| 6,015,015 A | 1/2000 | Luft et al. |
| 6,016,867 A | 1/2000 | Gregoli et al. |
| 6,016,868 A | 1/2000 | Gregoli et al. |
| 6,026,914 A | 2/2000 | Adams et al. |
| 6,039,116 A | 3/2000 | Stevenson et al. |
| 6,039,121 A | 3/2000 | Kisman |
| 6,048,810 A | 4/2000 | Baychar |
| 6,050,335 A | 4/2000 | Parsons |
| 6,056,057 A | 5/2000 | Vinegar et al. |
| 6,102,122 A | 8/2000 | de Rouffignac |
| 6,109,358 A | 8/2000 | McPhee et al. |
| 6,148,911 A | 11/2000 | Gipson et al. |
| 6,158,510 A | 12/2000 | Bacon et al. |
| 6,158,513 A | 12/2000 | Nistor et al. |
| 6,167,966 B1 | 1/2001 | Ayasse et al. |
| 6,173,775 B1 | 1/2001 | Elias et al. |
| 6,186,232 B1 | 2/2001 | Isaccs et al. |
| 6,189,611 B1 | 2/2001 | Kasevich |
| 6,205,289 B1 | 3/2001 | Kobro |
| 6,230,814 B1 | 5/2001 | Nasr et al. |
| 6,244,341 B1 | 6/2001 | Miller |
| 6,257,334 B1 | 7/2001 | Cyr et al. |
| 6,263,965 B1 | 7/2001 | Schmidt et al. |
| 6,276,457 B1 | 8/2001 | Moffatt et al. |
| 6,285,014 B1 | 9/2001 | Beck et al. |
| 6,305,472 B2 | 10/2001 | Richardson et al. |
| 6,318,464 B1 | 11/2001 | Mokrys |
| 6,325,147 B1 | 12/2001 | Doerler et al. |
| 6,328,104 B1 | 12/2001 | Graue |
| 6,353,706 B1 | 3/2002 | Bridges |
| 6,357,526 B1 | 3/2002 | Abdel-Halim et al. |
| 6,405,799 B1 | 6/2002 | Vallejos et al. |
| 6,409,226 B1 | 6/2002 | Slack et al. |
| 6,412,557 B1 | 7/2002 | Ayasse et al. |
| 6,413,016 B1 | 7/2002 | Nelson et al. |
| 6,454,010 B1 | 9/2002 | Thomas et al. |
| 6,484,805 B1 | 11/2002 | Perkins et al. |
| 6,536,523 B1 | 3/2003 | Kresnyak et al. |
| 6,554,067 B1 | 4/2003 | Davies et al. |
| 6,561,274 B1 | 5/2003 | Hayes et al. |
| 6,581,684 B2 | 6/2003 | Wellington et al. |
| 6,588,500 B2 | 7/2003 | Lewis |
| 6,591,908 B2 | 7/2003 | Nasr |
| 6,607,036 B2 | 8/2003 | Ranson et al. |
| 6,631,761 B2 | 10/2003 | Yuan et al. |
| 6,662,872 B2 | 12/2003 | Gutek et al. |
| 6,666,666 B1 | 12/2003 | Gilbert et al. |

(56) References Cited

U.S. PATENT DOCUMENTS

| | | |
|---|---|---|
| 6,681,859 B2 | 1/2004 | Hill |
| 6,688,387 B1 | 2/2004 | Wellington et al. |
| 6,702,016 B2 | 3/2004 | de Rouffignac et al. |
| 6,708,759 B2* | 3/2004 | Leaute .................. E21B 43/24 166/263 |
| 6,712,136 B2 | 3/2004 | de Rouffignac et al. |
| 6,712,150 B1 | 3/2004 | Misselbrook et al. |
| 6,715,546 B2 | 4/2004 | Vinegar et al. |
| 6,715,547 B2 | 4/2004 | Vinegar et al. |
| 6,715,548 B2 | 4/2004 | Wellington et al. |
| 6,715,549 B2 | 4/2004 | Wellington et al. |
| 6,719,047 B2 | 4/2004 | Fowler et al. |
| 6,722,429 B2 | 4/2004 | de Rouffignac et al. |
| 6,722,431 B2 | 4/2004 | Karanikas et al. |
| 6,725,920 B2 | 4/2004 | Zhang et al. |
| 6,729,394 B1 | 5/2004 | Hassan et al. |
| 6,729,395 B2 | 5/2004 | Shahin, Jr. et al. |
| 6,729,397 B2 | 5/2004 | Zhang et al. |
| 6,729,401 B2 | 5/2004 | Vinegar et al. |
| 6,732,794 B2 | 5/2004 | Wellington et al. |
| 6,732,795 B2 | 5/2004 | de Rouffignac et al. |
| 6,732,796 B2 | 5/2004 | Vinegar et al. |
| 6,733,636 B1 | 5/2004 | Heins |
| 6,736,215 B2 | 5/2004 | Maher et al. |
| 6,736,222 B2 | 5/2004 | Kuckes et al. |
| 6,739,394 B2 | 5/2004 | Vinegar et al. |
| 6,742,588 B2 | 6/2004 | Wellington et al. |
| 6,742,593 B2 | 6/2004 | Vinegar et al. |
| 6,745,831 B2 | 6/2004 | de Rouffignac et al. |
| 6,745,832 B2 | 6/2004 | Wellington et al. |
| 6,745,837 B2 | 6/2004 | Wellington et al. |
| 6,755,246 B2 | 6/2004 | Chen et al. |
| 6,758,268 B2 | 7/2004 | Vinegar et al. |
| 6,769,486 B2 | 8/2004 | Lim et al. |
| 6,782,947 B2 | 8/2004 | de Rouffignac et al. |
| 6,789,625 B2 | 9/2004 | de Rouffignac et al. |
| 6,794,864 B2 | 9/2004 | Mirotchnik et al. |
| 6,805,195 B2 | 10/2004 | Vinegar et al. |
| 6,814,141 B2 | 11/2004 | Huh et al. |
| 6,877,556 B2 | 4/2005 | Wittle et al. |
| 6,883,607 B2 | 4/2005 | Nenniger et al. |
| 6,962,466 B2 | 11/2005 | Vinegar et al. |
| 7,013,970 B2 | 3/2006 | Collie et al. |
| 7,056,725 B1 | 6/2006 | Lu |
| 7,069,990 B1 | 7/2006 | Bilak |
| 7,272,973 B2 | 9/2007 | Craig |
| 7,294,156 B2 | 11/2007 | Chakrabarty et al. |
| 7,322,409 B2 | 1/2008 | Wittle et al. |
| 7,363,973 B2 | 4/2008 | Nenniger et al. |
| 7,434,619 B2 | 10/2008 | Rossi et al. |
| 7,464,756 B2 | 12/2008 | Gates et al. |
| 7,527,096 B2 | 5/2009 | Chung et al. |
| 7,770,643 B2 | 8/2010 | Daussin |
| 7,918,269 B2 | 4/2011 | Cavender et al. |
| 7,975,763 B2 | 7/2011 | Banerjee et al. |
| 8,141,636 B2 | 3/2012 | Speirs et al. |
| 8,176,982 B2 | 5/2012 | Gil et al. |
| 8,215,392 B2 | 7/2012 | Rao |
| 8,256,511 B2 | 9/2012 | Boone et al. |
| 8,327,936 B2 | 12/2012 | Coskuner |
| 8,434,551 B2 | 5/2013 | Nenniger et al. |
| 8,455,405 B2 | 6/2013 | Chakrabarty |
| 8,474,531 B2 | 7/2013 | Nasr et al. |
| 8,528,642 B2 | 9/2013 | Boone |
| 8,596,357 B2 | 12/2013 | Nenniger |
| 8,602,098 B2 | 12/2013 | Kwan et al. |
| 8,616,278 B2 | 12/2013 | Boone et al. |
| 8,684,079 B2 | 4/2014 | Wattenbarger et al. |
| 8,752,623 B2 | 6/2014 | Sirota et al. |
| 8,770,289 B2 | 7/2014 | Boone |
| 8,776,900 B2 | 7/2014 | Nenniger et al. |
| 8,783,358 B2 | 7/2014 | Critsinelis et al. |
| 8,844,639 B2 | 9/2014 | Gupta et al. |
| 8,857,512 B2 | 10/2014 | Nenniger et al. |
| 8,899,321 B2 | 12/2014 | Dawson et al. |
| 8,985,205 B2 | 3/2015 | Nenniger |
| 9,103,205 B2 | 8/2015 | Wright et al. |
| 9,115,577 B2 | 8/2015 | Alvestad et al. |
| 9,316,096 B2 | 4/2016 | Bang et al. |
| 9,341,049 B2 | 5/2016 | Hailey, Jr. et al. |
| 9,347,312 B2 | 5/2016 | Vincelette et al. |
| 9,359,868 B2 | 6/2016 | Scott |
| 9,394,769 B2 | 7/2016 | Nenniger |
| 9,488,040 B2 | 11/2016 | Chakrabarty et al. |
| 9,506,332 B2 | 11/2016 | Saeedfar |
| 9,644,467 B2 | 5/2017 | Chakrabarty |
| 9,739,123 B2 | 8/2017 | Wheeler et al. |
| 9,809,786 B2 | 11/2017 | Olson et al. |
| 9,845,669 B2 | 12/2017 | Miller et al. |
| 9,951,595 B2 | 4/2018 | Akinlade et al. |
| 9,970,282 B2 | 5/2018 | Khaledi et al. |
| 9,970,283 B2 | 5/2018 | Khaledi et al. |
| 10,000,998 B2 | 6/2018 | Chakrabarty et al. |
| 10,041,340 B2 | 8/2018 | Chakrabarty |
| 10,094,208 B2 | 10/2018 | Hoier et al. |
| 10,145,226 B2 | 12/2018 | Yee et al. |
| 2001/0009830 A1 | 7/2001 | Bachar |
| 2001/0017206 A1 | 8/2001 | Davidson et al. |
| 2001/0018975 A1 | 9/2001 | Richardson et al. |
| 2002/0029881 A1 | 3/2002 | de Rouffignac et al. |
| 2002/0033253 A1 | 3/2002 | de Rouffignac et al. |
| 2002/0038710 A1 | 4/2002 | Maher et al. |
| 2002/0040779 A1 | 4/2002 | Wellington et al. |
| 2002/0046838 A1 | 4/2002 | Karanikas et al. |
| 2002/0056551 A1 | 5/2002 | Wellington et al. |
| 2002/0104651 A1 | 8/2002 | McClung, III |
| 2002/0148608 A1 | 10/2002 | Shaw |
| 2002/0157831 A1 | 10/2002 | Kurlenya et al. |
| 2003/0000711 A1 | 1/2003 | Gutek et al. |
| 2003/0009297 A1 | 1/2003 | Mirotchnik et al. |
| 2006/0231455 A1 | 10/2006 | Olsvik et al. |
| 2008/0017372 A1* | 1/2008 | Gates ..................... E21B 43/16 166/254.1 |
| 2008/0115945 A1 | 5/2008 | Lau et al. |
| 2008/0153717 A1 | 6/2008 | Pomerleau et al. |
| 2008/0173447 A1 | 7/2008 | Da Silva et al. |
| 2009/0288826 A1 | 11/2009 | Gray |
| 2010/0258308 A1 | 10/2010 | Speirs et al. |
| 2010/0276140 A1 | 11/2010 | Edmunds et al. |
| 2010/0276341 A1 | 11/2010 | Speirs et al. |
| 2010/0276983 A1 | 11/2010 | Dunn et al. |
| 2010/0282593 A1 | 11/2010 | Speirs et al. |
| 2011/0229071 A1 | 9/2011 | Vincelette et al. |
| 2011/0272152 A1 | 11/2011 | Kaminsky et al. |
| 2011/0272153 A1 | 11/2011 | Boone et al. |
| 2011/0276140 A1 | 11/2011 | Vresilovic et al. |
| 2011/0303423 A1 | 12/2011 | Kaminsky et al. |
| 2012/0234535 A1 | 9/2012 | Dawson et al. |
| 2012/0285700 A1 | 11/2012 | Scott |
| 2013/0000896 A1 | 1/2013 | Boone |
| 2013/0000898 A1 | 1/2013 | Boone |
| 2013/0025861 A1 | 1/2013 | Kift et al. |
| 2013/0043025 A1 | 2/2013 | Scott |
| 2013/0045902 A1 | 2/2013 | Thompson et al. |
| 2013/0098607 A1 | 4/2013 | Kerr |
| 2013/0105147 A1 | 5/2013 | Scott |
| 2013/0112408 A1 | 5/2013 | Oxtoby |
| 2013/0153215 A1 | 6/2013 | Scott et al. |
| 2013/0153216 A1 | 6/2013 | Scott |
| 2013/0199777 A1 | 8/2013 | Scott |
| 2013/0199779 A1 | 8/2013 | Scott |
| 2013/0199780 A1 | 8/2013 | Scott |
| 2013/0206405 A1 | 8/2013 | Kift et al. |
| 2013/0328692 A1 | 12/2013 | Johannessen |
| 2014/0034305 A1 | 2/2014 | Dawson |
| 2014/0048259 A1 | 2/2014 | Menard |
| 2014/0054028 A1 | 2/2014 | Little et al. |
| 2014/0069641 A1 | 3/2014 | Kosik |
| 2014/0083694 A1 | 3/2014 | Scott et al. |
| 2014/0083706 A1 | 3/2014 | Scott et al. |
| 2014/0096959 A1 | 4/2014 | Hocking |
| 2014/0144627 A1 | 5/2014 | Salazar Hernandez et al. |
| 2014/0174744 A1 | 6/2014 | Boone et al. |
| 2014/0251596 A1 | 9/2014 | Gittins et al. |

(56) References Cited

U.S. PATENT DOCUMENTS

| | | | |
|---|---|---|---|
| 2015/0034555 | A1 | 2/2015 | Speirs et al. |
| 2015/0053401 | A1 | 2/2015 | Khaledi et al. |
| 2015/0083413 | A1 | 3/2015 | Salazar et al. |
| 2015/0107833 | A1 | 4/2015 | Boone et al. |
| 2015/0107834 | A1 | 4/2015 | Shen et al. |
| 2015/0144345 | A1 | 5/2015 | Bilozir et al. |
| 2016/0061014 | A1 | 3/2016 | Sood et al. |
| 2016/0153270 | A1 | 6/2016 | Chen et al. |
| 2017/0051597 | A1 | 2/2017 | Akiya et al. |
| 2017/0130572 | A1 | 5/2017 | Yuan et al. |
| 2017/0210972 | A1 | 7/2017 | Williamson et al. |
| 2017/0241250 | A1 | 8/2017 | Singh et al. |
| 2018/0030381 | A1 | 2/2018 | Olson et al. |
| 2018/0073337 | A1 | 3/2018 | Park et al. |
| 2018/0265768 | A1 | 9/2018 | Williamson |
| 2019/0002755 | A1 | 1/2019 | Wang et al. |
| 2019/0032460 | A1 | 1/2019 | Khaledi et al. |
| 2019/0032462 | A1 | 1/2019 | Motahhari et al. |
| 2019/0063199 | A1 | 2/2019 | Doraiswamy et al. |
| 2019/0119577 | A1 | 4/2019 | Witham et al. |
| 2019/0120043 | A1 | 4/2019 | Gupta et al. |

FOREIGN PATENT DOCUMENTS

| | | |
|---|---|---|
| CA | 0852003 A | 9/1970 |
| CA | 0956885 A | 10/1974 |
| CA | 0977675 A | 11/1975 |
| CA | 1015656 A | 8/1977 |
| CA | 1027851 A | 3/1978 |
| CA | 1059432 A | 7/1979 |
| CA | 1061713 A | 9/1979 |
| CA | 1072442 A | 2/1980 |
| CA | 1295118 C | 2/1992 |
| CA | 1300000 C | 5/1992 |
| CA | 2108723 A1 | 4/1995 |
| CA | 2108349 C | 8/1996 |
| CA | 2369244 C | 4/2005 |
| CA | 2147079 C | 10/2006 |
| CA | 2235085 C | 1/2007 |
| CA | 2281276 C | 2/2007 |
| CA | 2647973 A1 | 10/2007 |
| CA | 2304938 C | 2/2008 |
| CA | 2299790 C | 7/2008 |
| CA | 2633061 A1 | 7/2008 |
| CA | 2374115 C | 5/2010 |
| CA | 2652930 A1 | 7/2010 |
| CA | 2621991 C | 9/2010 |
| CA | 2660227 A1 | 9/2010 |
| CA | 2730875 A1 | 8/2012 |
| CA | 2971941 A1 | 12/2012 |
| CA | 2436158 C | 6/2013 |
| CA | 2553297 C | 7/2013 |
| CA | 2654848 C | 10/2013 |
| CA | 2777966 A1 | 11/2013 |
| CA | 2781273 C | 5/2014 |
| CA | 2804521 A1 | 7/2014 |
| CA | 2917260 A1 | 1/2015 |
| CA | 2917263 A1 | 1/2015 |
| CA | 2841520 A1 | 2/2015 |
| CA | 2785871 C | 5/2015 |
| CA | 2691399 C | 9/2015 |
| CA | 2847759 A1 | 9/2015 |
| CA | 2893170 A1 | 11/2015 |
| CA | 2853445 A1 | 12/2015 |
| CA | 2854171 A1 | 12/2015 |
| CA | 2898065 A1 | 1/2016 |
| CA | 2962274 A1 | 1/2016 |
| CA | 2890491 A1 | 2/2016 |
| CA | 2893221 C | 4/2016 |
| CA | 2872120 A1 | 5/2016 |
| CA | 2875846 C | 5/2016 |
| CA | 2900179 C | 5/2016 |
| CA | 2898943 C | 6/2016 |
| CA | 2897785 C | 7/2016 |
| CA | 2900178 C | 9/2016 |
| CA | 2707776 C | 11/2016 |
| CA | 2893552 C | 11/2016 |
| CA | 2935652 A1 | 1/2017 |
| CA | 2857329 C | 2/2017 |
| CA | 2915571 C | 2/2017 |
| CA | 2856460 C | 5/2017 |
| CA | 2956771 A1 | 8/2017 |
| CA | 2981619 A1 | 12/2017 |
| CA | 2875848 C | 5/2018 |
| CA | 2899805 C | 5/2018 |
| CA | 2928044 C | 7/2018 |
| CA | 2974714 C | 9/2018 |
| CA | 2965117 A1 | 10/2018 |
| CA | 2958715 C | 3/2019 |
| CN | 101870894 | 4/2009 |
| EP | 0144203 A2 | 6/1985 |
| EP | 0261793 A1 | 3/1988 |
| EP | 0283602 A1 | 9/1988 |
| EP | 0747142 B1 | 4/2001 |
| FR | 2852713 | 9/2004 |
| GB | 1457696 A | 12/1976 |
| GB | 1463444 A | 2/1977 |
| GB | 2156400 A | 10/1985 |
| GB | 2164978 A | 4/1986 |
| GB | 2286001 B | 10/1995 |
| GB | 2357528 A | 6/2001 |
| GB | 2391890 A | 2/2004 |
| GB | 2391891 A | 2/2004 |
| GB | 2403443 A | 1/2005 |
| KR | 20130134846 | 5/2012 |
| WO | 1982/01214 A1 | 4/1982 |
| WO | 1989/12728 A1 | 12/1989 |
| WO | 1994/21889 A3 | 9/1994 |
| WO | 1999/67503 A1 | 12/1999 |
| WO | 2000/25002 A1 | 5/2000 |
| WO | 2000/66882 A1 | 11/2000 |
| WO | 2001/81239 A2 | 11/2001 |
| WO | 2001/81715 A2 | 11/2001 |
| WO | 2001/92673 A2 | 12/2001 |
| WO | 2001/92768 A2 | 12/2001 |
| WO | 2002/086018 A2 | 10/2002 |
| WO | 2002/086276 A2 | 10/2002 |
| WO | 2003/010415 A1 | 2/2003 |
| WO | 2003/036033 A1 | 5/2003 |
| WO | 2003/036038 A2 | 5/2003 |
| WO | 2003/036039 A1 | 5/2003 |
| WO | 2003/036043 A2 | 5/2003 |
| WO | 2003/038233 A1 | 5/2003 |
| WO | 2003/040513 A2 | 5/2003 |
| WO | 2003/062596 A1 | 7/2003 |
| WO | 2004/038173 A1 | 5/2004 |
| WO | 2004/038174 A2 | 5/2004 |
| WO | 2004/038175 A1 | 5/2004 |
| WO | 2004/050567 A1 | 6/2004 |
| WO | 2004/050791 A1 | 6/2004 |
| WO | 2004/097159 A3 | 11/2004 |
| WO | 2005/012688 A1 | 2/2005 |
| WO | 2015/158371 A1 | 10/2015 |
| WO | 2017/222929 A1 | 12/2017 |

OTHER PUBLICATIONS

Andrade, M.R., et al. (2007), "Mixotrophic cultivation of microalga Spirulina platensis using molasses as organic substrate", *Aquaculture*, vol. 264, pp. 130-134.

Bayestehparvin, B., et al. (2015) "Dissolution an dMobilization of Bitumen at Pore Scale", SPE174482-MS, *Prepared for presentation at the SPE Canada Heavy Oil Technical Conference held in Calgary*, Alberta, Canada, Jun. 9-11, 2015; 23 pages.

Butler, R. M. et al. (1991) "A new process (VAPEX) for recovering heavy oils using hot water and hydrocarbon vapour", *CIM/SPE Annual Technical Conference* Jan.-Feb. vol. 30, No. 1, pp. 97-106.

Butler, R. M. et al. (1993) "Recovery of Heavy Oils Using Vapourized Hydrocarbon Solvents: Further Development of the Vapex Process" *The Journal of Canadian Petroleum Technology*, June, vol. 32, No. 6, pp. 56-64.

(56) References Cited

OTHER PUBLICATIONS

Castanier, L.M., et al. (2005) "Heavy oil upgrading in-situ via solvent injection andcombustion: A "new" method", *EAGE 67th Conference & Exhibition*—Madrid, Spain, Jun. 13-16, 2005; 4 pages.

Cristofari, J., et al. (2008) "Laboratory Investigation of the Effect of Solvent Injection on In-Situ Combustion" SPE 99752 prepared for presentation at the 2006 SPE/DOE Symposium on Improved Oil Recovery, Tulsa, Apr. 22-26. 11 pages.

Cunha, L.B. (2005) "Recent In-Situ Oil Recovery-Technologies for Heavy- and Extraheavy-Oil Reserves", SPE 94986, prepared for presentation at the 2005 SPE Latin American and Caribbean Petroleum Enginerring Conference held in Rio de Janeiro, Brazil, Jun. 20-23; 5 pages.

Deng, X (2005) "Recovery Performance and Economics of Steam/Propane Hybrid Process." SPE/PS-CIM/CHOA 97760, PS2005-341, SPE/PS-CIM/CHOA International Thermal Operations and Heavy Oil Symposium, copyright, pp. 1-7.

Diaz, J. A. D. (2006) "An Experimental Study of Steam and Steam-Propane Injection Using a Novel Smart Horizontal Producer to Enhance Oil Production in the San Ardo Field." Presentation given at Sponsor's Meeting, Crisman Institute, Aug. 3, Department of Petroleum Engineering, Texas A&M University (7 pages).

Doan, Q., et al. (2011) "Potential Pitfalls From Successful History-Match Simulation of a Long-Running Clearwater-Fm Sagd Well Pair" SPE 147318, Prepared for presentation at the SPE Annual Technical Conference and Exhibition held in Denver, Colorado, Oct. 30-Nov. 2; 9 pages.

D'Silva, J, et al. (2008) "In-Situ Combustion With Solvent Injection" SPE 117684, Prepared for presentation at the SPE International Thermal Operations and Heavy Oil Symposium held in Calgary, Alberta, Canada, Oct. 20-23; 11 pages.

D'Silva, J., et al. (2011) "Integration of In-Situ Combustion With Solvent Injection—A Detailed Study" SPE 141570, Prepared for presentation at the SPE Projects and Facilities Challenges Conference at METS held in Doha, Qatar, Feb. 13-16; 11 pages.

Dunn-Norman, S., et al. (2002) "Recovery Methods for Heavy Oil in Ultra-Shallow Reservoirs" SPE 76710, prepared for presentation at the SPE Western Regional/AAPG Pacific Section Joint Meeting held in Anchorage, Alaska, May 20-22, 6 pages.

Frauenfeld, T.W., et al (2006) "Economic Analysis of Thermal Solvent Processes" Pet-Soc 2006-164; Presented at the Petroleum Socity's 7th Canadian International Peteroleum Conference (57th Annual Technical Meeting), Calgary, Alberta, Canada, Jun. 13-15, 2006; 9 pages.

Gates, I.D., et al. (2011) "Evolution of In Situ Oil Sands Recovery Technology: What Happened and What's New?" SPE150686, Prepared for presentation at the SPE Heavy Oil Conference and Exhibition held in Kuwait City, Kuwait, Dec. 12-14, 2011; 10 pages.

Ghoodjani, E., et al. (2012) "A Review on Thermal Enhanced Heavy Oil Recovery From Fractured Carbonate Reservoirs" SPE 150147, Prepared for presentation at the SPE Heavy Oil Conference Canada held in Calgary, Alberta, Canada, Jun. 12-14, 2012; 8 pages.

Goldthorpe, S. (2013) "Cement Plant CO2 to DME," *IEAGHG Information Paper*; 2013-IP9, Jun. 2013, 1 page.

Greaser, G.R., et al. (2003) "New Thermal Recovery Tech nology and Technology Transfer for Successful Heavy Oil Development." SPE69731, *Society of Petroleum Engineers*, Inc., 7 pages.

Hong, K.C. (1999) "Recent Advances in Steamflood Technology." SPE 54078, Copyright 1999, Society of Petroleum Engineers, Inc., 14 pages.

Jaiswal, N. J. (2006) "Experimental and Analytical Studies of Hydrocarbon Yields Under Dry-, Steam-, and Steam with Propane-Distillation." Presentation given at Crisman Institute's Halliburton Center for Unconventional Resources, Aug. 3, 2006, Department of Petroleum Engineering, Texas A&M University (5 pages).

Jiang, Q., et al. (2010) "Evaluation of Recovery Technologies for the Grosmont Carbonate Reservoirs" *Journal of Canadian Petroleum Technology*, vol. 49, No. 5, pp. 56-64.

Kamal, C., et al. (2012), "Spirulina platensis—A novel green inhibitor for acid corrosion of mild steel", *Arabian Journal of Chemistry*, vol. 5, pp. 155-161.

Khaledi, R., et al. (2018) "Azeotropic Heated Vapour Extraction—A New Thermal-Solvent Assisted Gravity Drainage Recovery Process", SPE189755-MS, SPE Canada Heavy Oil Technical Conference held in Calgary, Alberta, Canada, Mar. 13-14, 2018, 20 pages.

Lei, H., et al. (2012) "An Evaluation of Air Injection as a Follow-Up Process to Cyclic Steam Stimulation in a Heavy Oil Reservoir" SPE 150703, Prepared for presentation at the SPE Heavy Oil Conference Canada held in Calgary, Alberta, Canada, Jun. 12-14, 2012; 13 pages.

Lennox, T.R. et al (1980) "Geology of In Situ Pilot Project, Wabasca Oil Sands Deposit, Alberta" *Saskatchewan Geological Society Special Publication No. 5*; Conference and Core Seminar, Regina, Oct. 15-17, 1980; pp. 267-268.

Lim, G.B. et al. (1994) "Three Dimensional Scaled Physcial Modeling of Solvent Vapour Extraction of Cold Lake Bitumen," Canadian SPE Int'l Conf. on Recent Advances in Horizontal Well Applications, Paper No. HWC94-46, Calgary, Canada, Mar. 20-23, 1994, 11 pages.

Lim, G.B. et al. (1995) "Cyclic Stimulation of Cold Lake Oil Sand with Supercriticall Ethane," SPE #30298, Int'l Heavy Oil Symposium, Calgary, Alberta, Canada, Jun. 19-21, 1995, pp. 521-528.

Lyubovsky, M., et al. (2005) "Catalytic Partial 'Oxidation of Methane to Syngas' at Elevated Pressures," *Catalysis Letters*, v. 99, Nos. 3-4, Feb. 2005, pp. 113-117.

Mamora, D. D., (2006) "Thermal Oil Recovery Research at Texas A&M in the Past Five Years—an Overview." Presentation given at the Crisman Institute Halliburton Center for Unconventional Resources, Research Meeting Aug. 3, Department of Petroleum Engineering, Texas A&M University (13 pages).

Mert, B.D., et al. (2011) "The role of Spirulina platensis on corrosion behavior of carbon steel", *Materials Chemistry and Physics*, vol. 130, pp. 697-701.

Mokrys, I. J., et al. (1993) "In-Situ Upgrading of Heavy Oils andBitumen by Propane Deasphalting: The Vapex Process" SPE 25452, Mar. 21-23, Oklahoma City, OK, pp. 409-424.

Mulac, A.J.,et al. (1981) "Project Deep Steam Preliminary Field Test Bakersfield, California." SAND80-2843, Printed Apr. 62 pages.

Naderi, K., et al. (2015) "Effect of Bitumen Viscosity and Bitumen—Water Interfacial Tension on Steam Assisted Bitumen Recovery Process Efficiency", *Journal of Petroleum Science and Engineering* 133, pp. 862-868.

Nasr, T.N., et al. (2005) "Thermal Techniques for the Recovery of Heavy Oil and Bitumen" SPE 97488 prepared for presentation at the SPE International Improved Oil Recovery Conferencein Asia Pacific held in Kuala Lumpur, Malaysia, Dec. 5-6, 2005. 15 pages.

Nasr, T.N. et al. (2006) "New Hybrid Steam-Solvent Processes for the Recovery of Heavy Oil and Bitumen" SPE 101717 Prepared for presentation at the Abu Dhabi International Petroleum Exhibition and Conference held in Abu Dhabi, U.A.E., Nov. 5-8, 2006; 17 pages.

National Energy Board, (2004) "Canada's Oil Sands. Opportunities and Challenges to 2015." An Energy Market Assessment, May (158 pages).

Nexant, Inc. (2008), "Dimethyl Ether Technology and Markets," CHEMSystems PERP Program Report 07/08S3, Dec. 2008, 7 pages.

NTIS, Downhole Steam-Generator Study, vol. 1, Conception and Feasibility Evaluation. Final Report, Sep. 1978-Sep. 1980, Sandia National Labs, Albuquerque NM, Jun. 1982. 260 pages.

Oceaneering; Website: http://www.oceaneering.com/Brochures/MFX%20%Oceaneering%20Multiflex.pdf, Oceaneering Multiflex, Oceaneering International, Incorporated, printed Nov. 23, 2005, 2 pages.

Qi, G.X. et al. (2001) "DME Synthesis from Carbon Dioxide and Hydrogen Over Cu—Mo/HZSM-5," *Catalysis Letters*, V. 72, Nos. 1-2, 2001, pp. 121-124.

Redford, et al. (1980) "Hydrocarbon-Steam Processes for Recovery of Bitumen from Oil Sands" SPE8823, Prepared for presentation at

(56) References Cited

OTHER PUBLICATIONS the First Joint SPE/DOE Symposium on Enhanced Oil Recovery at Tulsa, Oklahoma, Apr. 20-23; 12 pages.

Saeedfar, A., et al. (2018) "Critical Consideration for Analysis of RF-Thermal Recovery of Heavy Petroleum" SPE-189714-MS, Prepared for presentation at the SPE Canada Heavy Oil Technical Conference held in Calgary, Alberta, Canada, Mar. 13-14, 2018; 13 pages.

Seibert, B. H. (2012) "Sonic Azeotropic Gravity Extraction of Heavy Oil From Oil Sands", SPE157849-MS, SPE Heavy Oil Conference Canda held in Calgary, Alberta, Canada, Jun. 12-14, 2012, 10 pages.

Sharma, J. et al. (2010) "Steam-Solvent Coupling at the Chamber Edge in an In Situ Bitumen Recovery Process" SPE 128045, Prepared for presentation at the SPE Oil and Gas India Conference and Exhibition held in Mumbai, India Jan. 20-22; 26 pages.

Stark, S.D. (2013) "Cold Lake Commercialization of the Liquid Addition to Steam for Enhancing Recovery (Laser) Process" IPTC 16795, Prepared for presentation at the International Petroleum Technology Conference held in Beijing, China, Mar. 26-28, 2013, 15 pages.

Wan Nik, W.B., et al. (2012), "Marine Extracts as Corrosion Inhibitor for Aluminum in Seawater Applications", *International Journal of Engineering Research and Applications* (IJERA), vol. 2, Issue 1; pp. 455-458.

Zhang, L. et al. (2013) "Dehydration of Methanol to Dimethyl Ether Over y—Al2O3 Catalyst: Intrinsic Kinetics and Effectiveness Factor," *Canadian Journal of Chem. Engineering*, v.91, Sep. 2013, pp. 1538-1546.

International Search Report and the Written Opinion of the International Searching Authority, or the Declaration (2 pages), International Search Report (4 pages), and Written Opinion of the International Searching Authority (6 pages) for International Application No. PCT/US2007/080985 dated Feb. 28, 2008.

International Preliminary Report on Patentability (2 pages); Written Opinion of the International Searching Authority (6 pages); all dated Apr. 23, 2009 in PCT International Application No. PCT/US2007/080985 filed Oct. 10, 2007 (Total 8 pages).

\* cited by examiner

THERMAL RECOVERY METHODS FOR RECOVERING VISCOUS HYDROCARBONS FROM A SUBTERRANEAN FORMATION

CROSS-REFERENCE TO RELATED APPLICATION

This application claims priority from Canadian Patent Application 2,978,157 filed 31 Aug. 2017 entitled THERMAL RECOVERY METHODS FOR RECOVERING VISCOUS HYDROCARBONS FROM A SUBTERRANEAN FORMATION, the entirety of which is incorporated by reference herein.

FIELD OF THE DISCLOSURE

The present disclosure is directed generally to thermal recovery methods of recovering viscous hydrocarbons from a subterranean formation and more particularly to thermal recovery methods that sequentially inject a heated solvent vapor stream and a steam stream into the subterranean formation.

BACKGROUND OF THE DISCLOSURE

Hydrocarbons often are utilized as fuels and/or as chemical feedstocks for manufacturing industries. Hydrocarbons naturally may be present within subterranean formations, which also may be referred to herein as reservoirs and/or as hydrocarbon reservoirs. Such hydrocarbons may occur in a variety of forms, which broadly may be categorized herein as conventional hydrocarbons and unconventional hydrocarbons. A process utilized to remove a given hydrocarbon from a corresponding subterranean formation may be selected based upon one or more properties of the hydrocarbon and/or of the subterranean formation.

Examples of hydrocarbon production techniques that may be utilized to produce viscous hydrocarbons from a subterranean formation include thermal recovery processes. Thermal recovery processes generally inject a thermal recovery stream, at an elevated temperature, into the subterranean formation. The thermal recovery stream contacts the viscous hydrocarbons, within the subterranean formation, and heats, dissolves, and/or dilutes the viscous hydrocarbons, thereby generating mobilized viscous hydrocarbons. The mobilized viscous hydrocarbons generally have a lower viscosity than a viscosity of the naturally occurring viscous hydrocarbons at the native temperature and pressure of the subterranean formation and may be pumped and/or flowed from the subterranean formation. A variety of different thermal recovery processes have been utilized, including cyclic steam stimulation processes, solvent-assisted cyclic steam stimulation processes, steam flooding processes, solvent-assisted steam flooding processes, steam-assisted gravity drainage processes, solvent-assisted steam-assisted gravity drainage processes, heated vapor extraction processes, liquid addition to steam to enhance recovery processes, and/or near-azeotropic gravity drainage processes.

Thermal recovery processes may differ in the mode of operation and/or in the composition of the thermal recovery stream. However, all thermal recovery processes rely on injection of the thermal recovery stream into the subterranean formation, at the elevated temperature, and thermal contact between the thermal recovery stream and the subterranean formation heats the subterranean formation.

In thermal recovery processes, such as heated vapor extraction, that utilize a solvent, or a hydrocarbon solvent, as the thermal recovery stream, solvent loss to the subterranean formation may increase production costs and/or limit production economies. As an example, a decrease in an amount of solvent needed to produce viscous hydrocarbons from the subterranean formation may cause a corresponding decrease in production costs as long as the savings associated with the decrease in solvent utilization is not offset by a corresponding increase in energy consumption.

In addition, recovered solvent generally is separated from the viscous hydrocarbons and re-injected into the subterranean formation, and increases in a volume of the solvent recycled also may increase production costs and/or limit production economies. As another example, a decrease in the volume of solvent produced from the subterranean formation may permit a corresponding decrease in surface facility size required for solvent separation, recovery, and re-injection, also decreasing production costs.

Historically, thermal recovery processes may utilize solvent inefficiently within the subterranean formation, leading to increased solvent loss to the subterranean formation and/or increased production of solvent from the subterranean formation. Thus, there exists a need for improved thermal recovery methods for recovering viscous hydrocarbons from a subterranean formation.

SUMMARY OF THE DISCLOSURE

Thermal recovery methods for recovering viscous hydrocarbons from a subterranean formation. The thermal recovery methods include performing a plurality of injection cycles. Each injection cycle in the plurality of injection cycles includes injecting a heated solvent vapor stream into a heated chamber that extends within the subterranean formation. The heated solvent vapor stream is injected via an at least substantially horizontal region of an injection well that extends within the heated chamber and for a heated solvent vapor injection time period. Each injection cycle also includes fluidly contacting the viscous hydrocarbons with the heated solvent vapor stream to generate a chamber liquid and/or mobilized viscous hydrocarbons. Each injection cycle further includes injecting a steam stream into the heated chamber. The steam stream is injected via the at least substantially horizontal region of the injection well and for a steam injection time period. The thermal recovery methods further include producing the chamber liquid and/or the mobilized viscous hydrocarbons from the subterranean formation. The producing may be performed during at least one injection cycle of the plurality of injection cycles.

DETAILED DESCRIPTION OF THE DISCLOSURE

Figure 1:
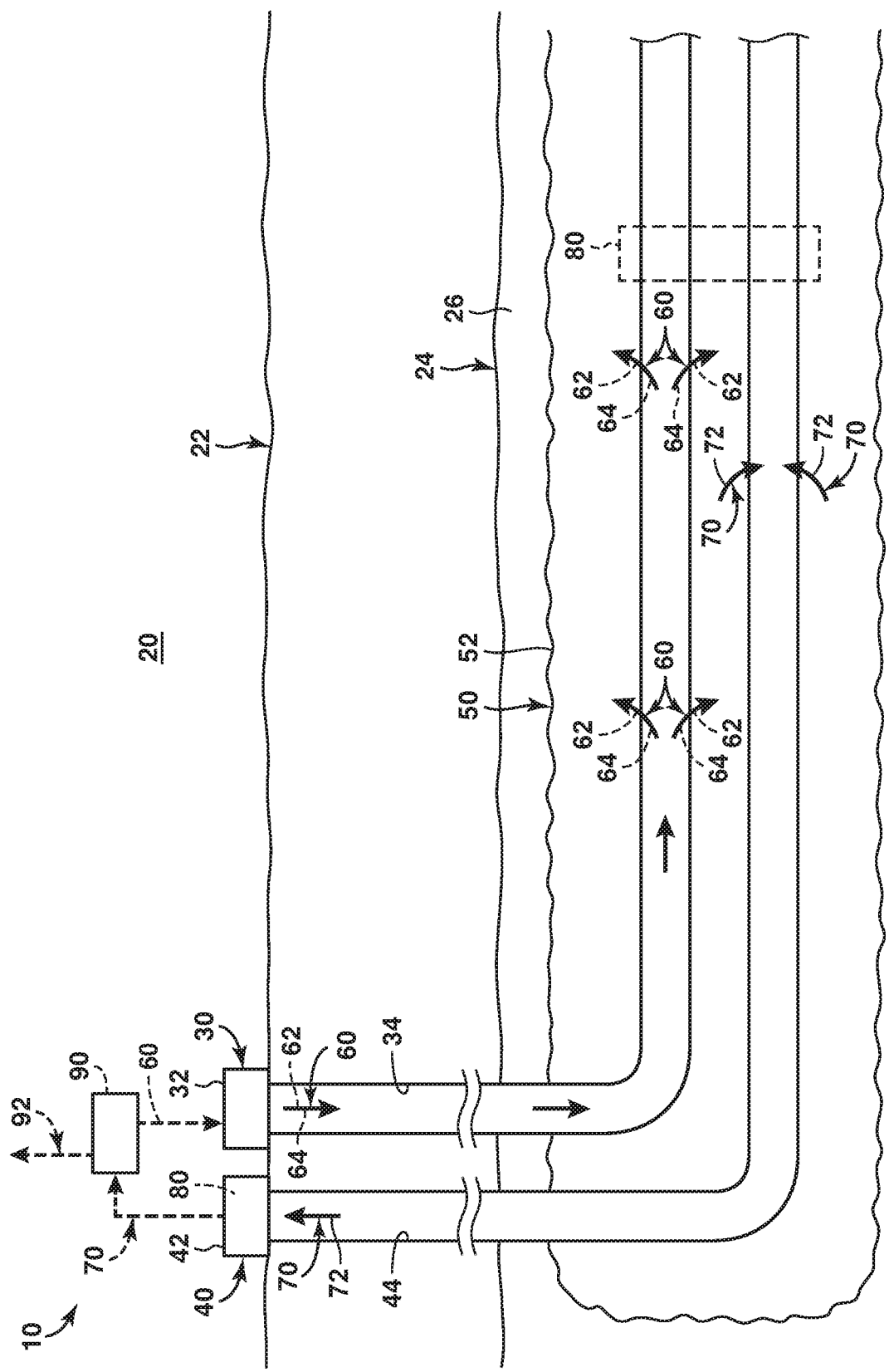
FIG. 1 is a schematic representation of examples of a hydrocarbon production system that may be utilized with methods according to the present disclosure.

FIGS. 1-8 provide examples of hydrocarbon production systems 10, of portions of hydrocarbon production systems 10, and/or of methods 100, according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic representation of examples of a hydrocarbon production system 10 that may be utilized with methods 100, according to the present disclosure. As illustrated in FIG. 1, hydrocarbon production system 10 includes an injection well 30 and a production well 40. Injection well 30 and production well 40 extend within a subterranean formation 24 that includes viscous hydrocarbons 26. Injection well 30 and production well 40 also may extend, or may be referred to herein as extending, between a surface region 20 and subterranean formation 24 and/or within a subsurface region 22.

Injection well 30 includes an injection wellhead 32 and an injection wellbore 34. Similarly, production well 40 includes a production wellhead 42 and a production wellbore 44.

During operation of hydrocarbon production system 10, injection well 30 may be utilized to provide, to supply, and/or to inject an injectant stream 60 into subterranean formation 24. Injectant stream 60 may include a heated solvent vapor stream 62 and/or a steam stream 64. Injectant stream 60 may interact with, contact, physically contact, fluidly contact, mix with, and/or heat viscous hydrocarbons 26, within subterranean formation 24, thereby producing, generating, and/or forming mobilized viscous hydrocarbons 72 within the subterranean formation. The mobilized viscous hydrocarbons may form a portion of a chamber liquid 70, which also may include a condensed fraction of injectant stream 60, such as a condensed fraction of the heated solvent vapor stream and/or a condensed fraction of the steam stream. Chamber liquid 70, including mobilized viscous hydrocarbons 72, may flow, under the influence of gravity, to production well 40, which may produce the chamber liquid and/or the mobilized viscous hydrocarbons from the subterranean formation.

Injection of injectant stream 60 into the subterranean formation and production of chamber liquid 70 from the subterranean formation may produce and/or generate a heated chamber 50 within the subterranean formation. The heated chamber may grow, with time, such as may be responsive to continued injection of the injectant stream and/or continued production of the chamber liquid. Heated chamber 50 and subterranean formation 24 may form and/or define an interface region 52 therebetween.

As schematically illustrated in dashed lines in FIG. 1, hydrocarbon production system 10 may include one or more sensors 80. Sensors 80, when present, may be adapted, configured, designed, constructed, and/or programmed to monitor and/or determine any suitable property of hydrocarbon production system 10, including subterranean formation 24, heated chamber 50, and/or chamber liquid 70. As an example, sensors 80 may be configured to monitor a composition variable of chamber liquid 70. The composition variable may indicate a solvent content, a water content, a viscous hydrocarbon content, and/or a mobilized viscous hydrocarbon content of chamber liquid 70 that is produced via production well 40. As additional examples, sensors 80 may be configured to monitor any suitable temperature, pressure, chemical composition, chemical property, and/or physical property of any suitable portion of hydrocarbon production system 10 and/or of streams that may flow within the hydrocarbon production system. Additional examples of variables that may be monitored by sensors 80 are disclosed herein.

As also schematically illustrated in dashed lines in FIG. 1, hydrocarbon production system 10 may include surface facilities 90. Surface facilities 90 also may be referred to herein as separation facilities 90 and may be adapted, configured, designed, and/or constructed to receive chamber liquid 70 that is produced from subterranean formation 24 and to separate the received chamber liquid into a produced hydrocarbon stream 92 and injectant stream 60. As such, the presence of surface facilities 90 may facilitate recycling, or re-injection, of the portion of the injectant stream that is produced from the subterranean formation with the produced chamber liquid.

Figure 4:
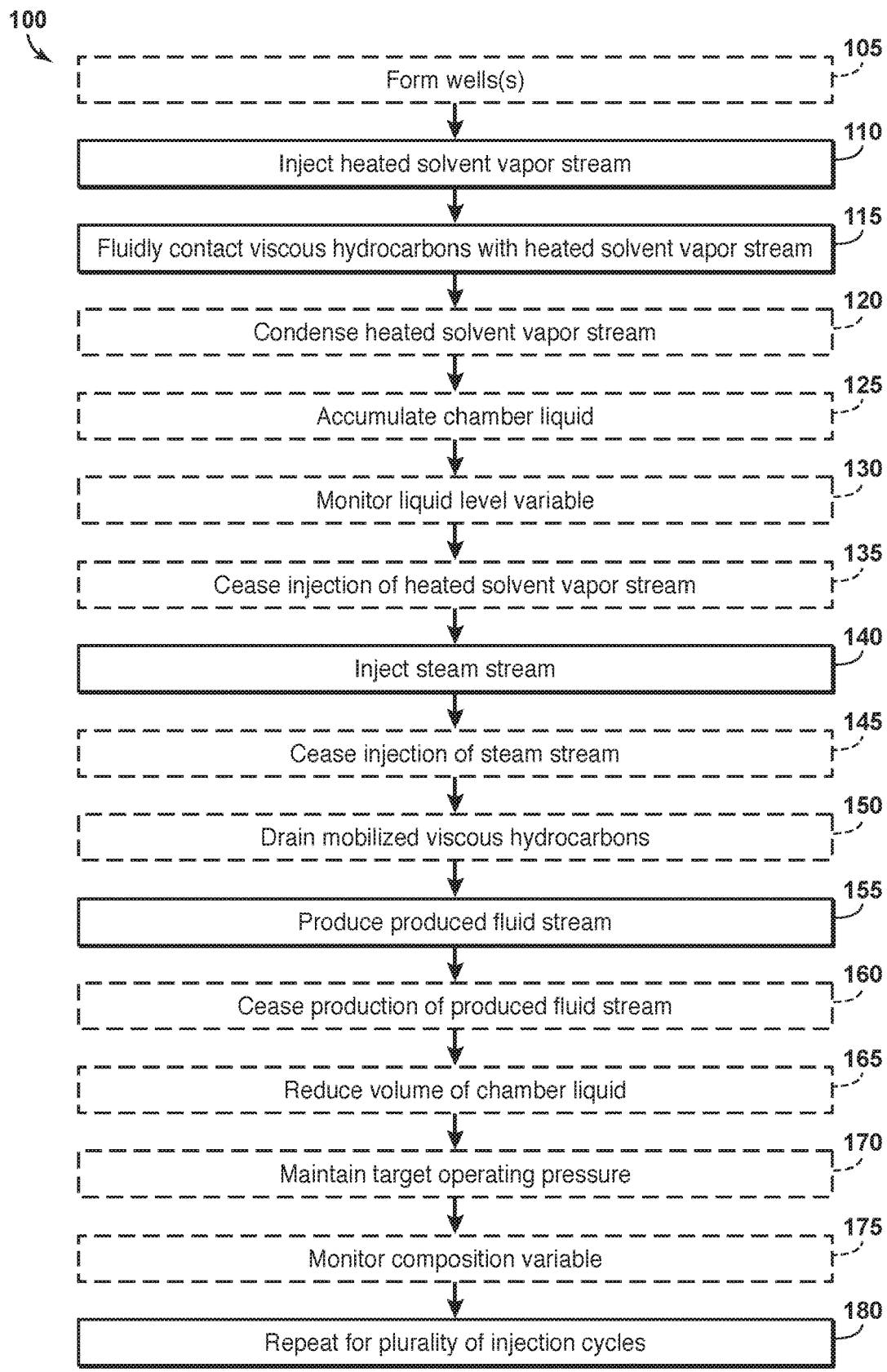
FIG. 4 is a flowchart depicting methods, according to the present disclosure, for recovering viscous hydrocarbons from a subterranean formation.

As discussed in more detail herein with reference to methods 100 of FIG. 4, hydrocarbon production system 10 may be utilized to perform a plurality of injection cycles. In each injection cycle, a heated solvent vapor stream initially may be injected into the subterranean formation. The heated solvent vapor stream may fluidly contact viscous hydrocarbons within the subterranean formation, thereby generating mobilized viscous hydrocarbons. Subsequent to injection of the heated solvent vapor stream for a heated solvent vapor injection time period, a steam stream may be injected into the subterranean formation for a stream injection time period.

The steam stream generally will have a higher temperature, and a higher concentration of thermal energy, when compared to the corresponding properties of the heated solvent vapor stream. Stated another way, a steam temperature, at which the steam stream has a given vapor pressure, may be greater than a solvent vapor temperature, at which the heated solvent vapor stream has the same given vapor pressure. In addition, a heat capacity and/or a heat of vaporization of the steam stream may be greater than a heat capacity and/or a heat of vaporization of the heated solvent vapor stream. As such, injection of the steam stream into subterranean formation 24 and/or into heated chamber 50 may vaporize condensed solvent that comes into contact with the steam stream.

This vaporization of condensed solvent may provide several benefits over thermal recovery processes that inject the heated solvent vapor stream but that do not subsequently, and cyclically, inject the steam stream. As an example, vaporization of the condensed solvent within the heated chamber, thereby re-forming the heated solvent vapor stream within the heated chamber, may improve and/or increase supply of the heated solvent vapor stream to interface region 52. This may improve the efficiency of solvent utilization within the subterranean formation and/or may decrease a volume of condensed solvent produced from the subterranean formation and provided to surface facilities 90. As another example, vaporization of the condensed solvent within the heated chamber may decrease a potential for loss of the condensed solvent within the heated chamber by providing a driving force for production of the condensed solvent from the subterranean formation via production well 40.

Figure 2:
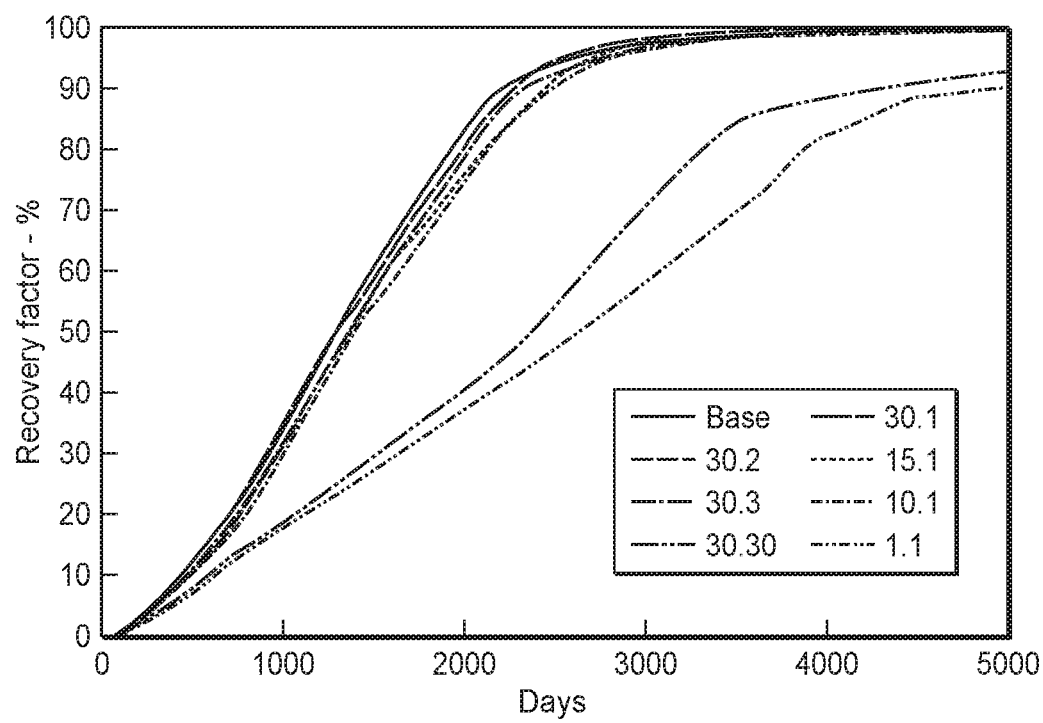
FIG. 2 is a plot illustrating recovery factor as a function of time for eight different injection strategies.

With the above in mind, FIG. 2 is a plot illustrating a recovery factor as a function of time for eight different injection strategies. As indicated as "Base" in FIG. 2, these injection strategies include a base, baseline, and/or control condition, in which the heated solvent vapor stream continuously is injected into the subterranean formation. The illustrated injection strategies further include seven experimental conditions in which heated solvent vapor and steam are sequentially injected for various relative timeframes. The recovery factor refers to a cumulative production of viscous hydrocarbons from the subterranean formation, and all plots are normalized to the base condition. A higher recovery factor generally is considered to indicate improved recovery of viscous hydrocarbons from the subterranean formation relative to a lower recovery factor. The experimental conditions include:

1) a 30.30 condition, in which each injection cycle includes 30 days of heated solvent vapor injection followed by 30 days of steam injection;
2) a 1.1 condition, in which each injection cycle includes 1 day of heated solvent vapor injection followed by 1 day of steam injection;
3) a 30.3 condition, in which each injection cycle includes 30 days of heated solvent vapor injection followed by 3 days of steam injection;
4) a 10.1 condition, in which each injection cycle includes 10 days of heated solvent vapor injection followed by 1 day of steam injection;
5) a 30.2 condition, in which each injection cycle includes 30 days of heated solvent vapor injection followed by 2 days of steam injection;
6) a 15.1 condition, in which each injection cycle includes 15 days of heated solvent vapor injection followed by 1 day of steam injection; and
7) a 30.1 condition, in which each injection cycle includes 30 days of heated solvent vapor injection followed by 1 day of steam injection.

As may be seen from FIG. 2, injection strategies that inject the heated solvent vapor stream and the steam stream for comparable time periods (e.g., the 30.30 and 1.1 conditions) exhibit a decrease in the recovery factor as a function of time when compared to injection strategies that inject the heated solvent vapor stream for a significantly longer amount of time when compared to the steam stream (e.g., the 30.3, 10.1, 30.2, 15.1, and 30.1 conditions). In general, viscous hydrocarbons may be converted more effectively to mobilized viscous hydrocarbons by the heated solvent vapor stream when compared to the steam stream. With this in mind, it is postulated that, in the 30.30 and 1.1 conditions, the steam injection time period is sufficient to facilitate flow of the steam stream to the interface region between the heated chamber and the subterranean formation. In contrast, for the experimental conditions in which the heated solvent vapor injection time is significantly greater than the steam injection time, it is postulated that the steam stream, or at least a majority of the steam stream, does not reach the interface region.

Figure 3:
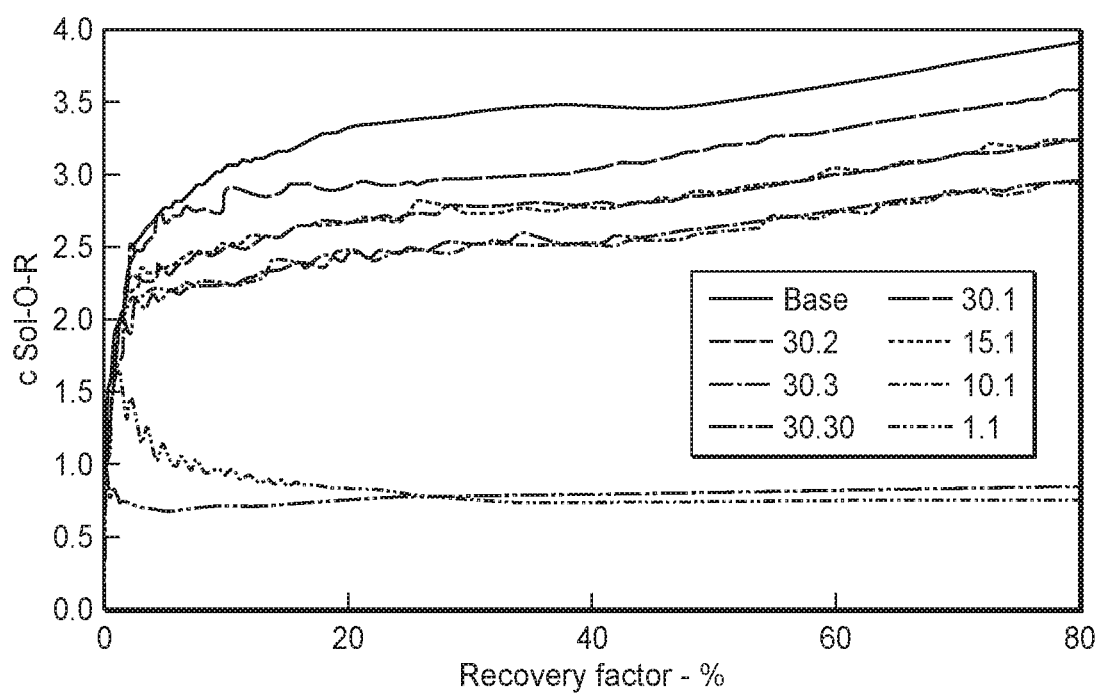
FIG. 3 is a plot illustrating cumulative solvent-to-oil ratio as a function of recovery factor for the injection strategies of FIG. 2.

FIG. 3 is a plot illustrating cumulative solvent-to-oil ratio as a function of recovery factor for the experimental conditions and/or injection strategies of FIG. 2. The cumulative solvent-to-oil ratio is a ratio of a volume of solvent utilized to produce a given volume of oil. A lower cumulative solvent-to-oil ratio generally is considered to indicate an improved efficiency of solvent utilization and/or lower solvent costs.

As may be seen from FIG. 3, for recovery factors greater than approximately 5%, there is a systematic decrease in cumulative solvent-to-oil ratio as an injection time ratio is decreased, with the injection time ratio being a ratio of the heated solvent vapor injection time period to the steam injection time period. This may be evidenced by the systematic decrease in the cumulative solvent-to-oil ratio when moving from the base case (for which the injection time ratio arguably is infinite) to the 30.1 experimental condition (30:1 injection time ratio) to the 30.2 and 15.1 experimental conditions (15:1 injection time ratio) to the 30.3 and 10.1 experimental conditions (10:1 injection time ratio) to the 30.30 and 1.1 experimental conditions (1:1 injection time ratio).

FIG. 3 also illustrates that the cumulative solvent-to-oil ratio also may be impacted, to some extent, not only by an absolute magnitude of the injection time ratio but also by a magnitude of the heated solvent vapor injection time period and/or by a magnitude of the steam injection time period. This impact may be evidenced by the difference between the 30.30 and 1.1 conditions in FIG. 3.

The combination of FIGS. 2-3 illustrates that the methods disclosed herein, which cyclically inject both heated solvent vapor and steam, may be utilized to improve the cumulative solvent-to-oil ratio when compared to methods that inject a heated solvent vapor stream but do not inject a steam stream (i.e., the base condition of FIGS. 2-3). However, this improvement in the cumulative solvent-to-oil ratio may be balanced against a decrease in recovery factor with time, at least for methods that utilize relatively lower injection time ratios.

FIG. 4 is a flowchart depicting methods 100, according to the present disclosure, for recovering viscous hydrocarbons from a subterranean formation. Methods 100 may include forming one or more wells at 105 and include injecting a heated solvent vapor stream at 110 and fluidly contacting viscous hydrocarbons with the heated solvent vapor stream at 115. Methods 100 also may include condensing the heated solvent vapor stream at 120, accumulating chamber liquid at 125, monitoring a liquid level variable at 130, and/or ceasing injection of the heated solvent vapor stream at 135. Methods 100 also include injecting a steam stream at 140 and may include ceasing injection of the steam stream at 145 and/or draining mobilized viscous hydrocarbons at 150. Methods 100 further include producing a produced fluid stream at 155 and may include reducing a volume of chamber liquid at 165, maintaining a target operating pressure at 170, and/or monitoring a composition variable at 175. Methods 100 also include repeating the methods for a plurality of injection cycles at 180.

Forming one or more wells at 105 may include forming any suitable type, number, and/or configuration of well in any suitable manner. The well may form a portion of a hydrocarbon production system, such as hydrocarbon production system 10 of FIG. 1. Examples of the well include an injection well and/or a production well. The injection well, when formed, may include a horizontal, or an at least substantially horizontal, region and/or portion. Similarly, the production well, when formed, may include a horizontal, or at least substantially horizontal, region and/or portion. As illustrated in FIG. 1, the horizontal region of the production well may extend below, vertically below, and/or at a greater depth within the subterranean formation when compared to the horizontal region of the injection well. FIGS. 5-8 are schematic cross-sectional views illustrating examples of injection wells 30 and/or production wells 40 that may be formed during the forming at 105.

Injecting the heated solvent vapor stream at 110 may include injecting any suitable heated solvent vapor stream into the subterranean formation and/or into a heated chamber that extends within the subterranean formation. The injecting at 110 may include injecting with, via, and/or utilizing the injection well and/or the horizontal region of the injection well.

The injecting at 110 also may include injecting for a heated solvent vapor injection time period. Examples of the heated solvent vapor injection time period include heated solvent vapor injection time periods of at least 0.1 days, at least 0.25 days, at least 0.5 days, at least 1 day, at least 2 days, at least 3 days, at least 4 days, at least 5 days, at least 6 days, at least 8 days, at least 10 days, at least 15 days, at least 20 days, at least 25 days, and/or at least 30 days. Additional examples of the heated solvent vapor injection time period include heated solvent vapor injection time periods of at most 45 days, at most 40 days, at most 35 days, at most 30 days, at most 25 days, at most 20 days, at most 15 days, at most 10 days, and/or at most 5 days.

The heated solvent vapor stream may have and/or define any suitable composition or chemical composition that includes at least 50 weight percent nonaqueous species, which also may be referred to herein as a solvent. The nonaqueous species non-negligibly solubilizes and/or dissolves the viscous hydrocarbons and may include a hydrocarbon, or a hydrocarbon solvent, examples of which are disclosed herein. As an example, the heated solvent vapor stream may consist of, or consist essentially of the nonaqueous species. As another example, the heated solvent vapor stream may include at least a threshold fraction of the nonaqueous species. Examples of the threshold fraction of nonaqueous species include threshold fractions of at least 50 weight percent (wt %), at least 51 wt %, at least 60 wt %, at least 70 wt %, at least 80 wt %, at least 90 wt %, at least 95 wt %, and/or at least 99 wt %. As more specific examples, the heated solvent vapor stream and/or the nonaqueous species may include, consist of, and/or consist essentially of one or more of a hydrocarbon, a hydrocarbon solvent, an alkane, an alkene, an alkyne, an aliphatic compound, a naphthenic compound, an aromatic compound, an olefinic compound, natural gas condensate, liquefied petroleum gas, and/or a crude oil refinery stream.

The heated solvent vapor stream also may include water and/or steam. As an example, the heated solvent vapor stream may include an azeotropic, or a near-azeotropic, mixture of hydrocarbon solvent and water. Under these conditions, a solvent molar fraction of the hydrocarbon solvent in the near-azeotropic mixture may be 70%-130% of an azeotropic molar fraction of the near-azeotropic mixture at the target operating pressure within the heated chamber.

It is within the scope of the present disclosure that a bubble point temperature of the heated solvent vapor stream at the target operating pressure within the heated chamber may be less than a bubble point temperature of the steam stream at the target operating pressure within the heated chamber. As such, and as discussed in more detail herein, the injecting at 140 may facilitate vaporization of condensed solvent within the heated chamber.

It is within the scope of the present disclosure that the injecting at 110 may be performed in a manner that is similar to that of more conventional solvent-based thermal recovery processes. As examples, the injecting at 110 may be performed in a manner that is similar to, or may be performed as part of, a heated vapor extraction process, an azeotropic heated vapor extraction process, and/or a near-azeotropic heated vapor extraction process.

Figure 5:
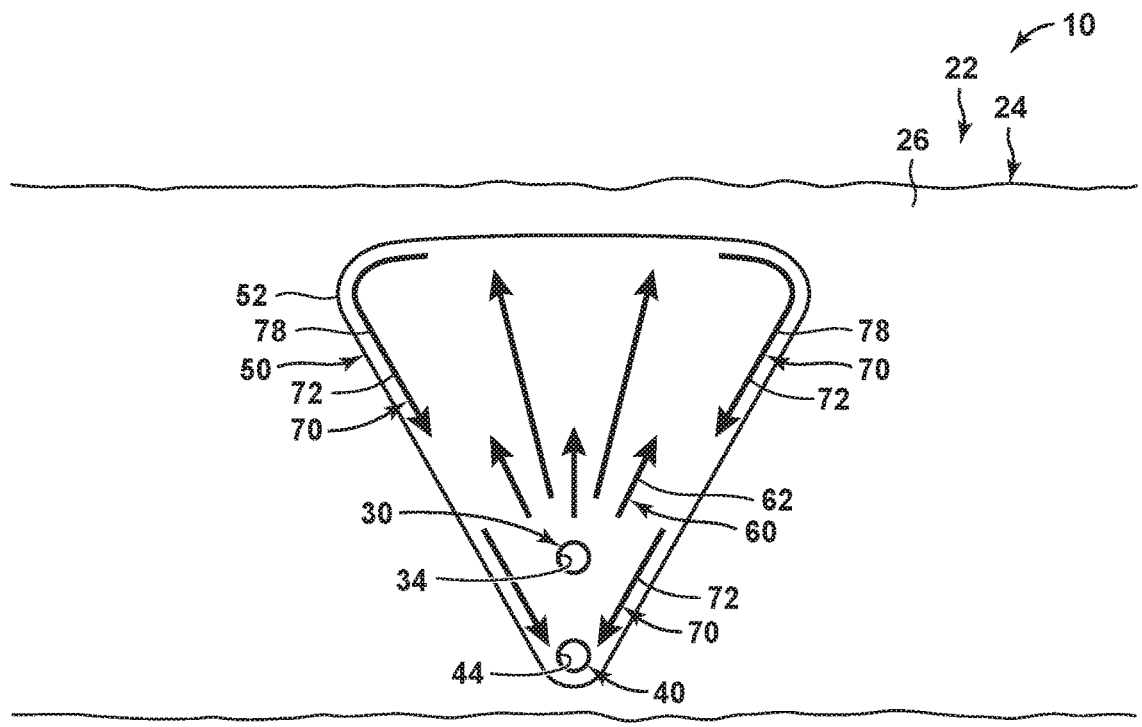
FIG. 5 is a schematic transverse cross-sectional view of a heated chamber illustrating a portion of the method of FIG. 4.

The injecting at 110 is illustrated schematically in FIG. 5. As illustrated therein, an injectant stream 60, in the form of a heated solvent vapor stream 62, may be injected into subterranean formation 24 and/or into heated chamber 50 via an injection well 30.

Fluidly contacting viscous hydrocarbons with the heated solvent vapor stream at 115 may include fluidly contacting to produce and/or generate mobilized viscous hydrocarbons within the heated chamber. This may be accomplished in any suitable manner. As examples, the fluidly contacting at 115 may include one or more of diluting the viscous hydrocarbons with the heated solvent vapor stream to generate the mobilized viscous hydrocarbons, dissolving the viscous hydrocarbons in the heated solvent vapor stream to generate the mobilized viscous hydrocarbons, and/or heating the viscous hydrocarbons with the heated solvent vapor stream to generate the mobilized viscous hydrocarbons.

The fluidly contacting at 115 also is schematically illustrated in FIG. 5. Therein, heated solvent vapor stream 62 may flow, within the heated chamber, to an interface region 52 between the heated chamber and the subterranean formation, may interact with viscous hydrocarbons 26 that are present within subterranean formation 24, and may generate a chamber liquid 70. Chamber liquid 70 may include and/or be mobilized viscous hydrocarbons 72 and/or condensed solvent 78.

Condensing the heated solvent vapor stream at 120 may include condensing the heated solvent vapor stream to produce and/or form condensed solvent and/or to form the chamber liquid that includes both the condensed solvent and the mobilized viscous hydrocarbons. The condensing at 120 may be facilitated by, responsive to, and/or a result of the fluidly contacting at 115. As an example, and as discussed, the fluidly contacting at 115 may include heating the viscous hydrocarbons to generate the mobilized viscous hydrocarbons. Under these conditions, heating of the viscous hydrocarbons may be accompanied by a corresponding decrease in a temperature of the heated solvent vapor stream, thereby causing the heated solvent vapor stream to release its heat of condensation and transition from the vapor phase to the liquid phase.

Additionally or alternatively, the condensing at 120 may be facilitated by, responsive to, and/or a result of thermal and/or fluid contact between the heated solvent vapor stream and subterranean strata that extends within the heated chamber. As an example, thermal and/or fluid contact between the heated solvent vapor stream and the subterranean strata may facilitate thermal energy transfer from the heated solvent vapor stream to the subterranean strata, thereby causing the heated solvent vapor stream to condense on the subterranean strata and generate the condensed solvent.

Accumulating chamber liquid at 125 may include accumulating the chamber liquid within the heated chamber. This may include accumulating the chamber liquid, which may include both the condensed solvent and the mobilized viscous hydrocarbons, to form a chamber liquid pool within the heated chamber. Additionally or alternatively, the accumulating at 125 may include accumulating the chamber liquid such that, or until, the at least substantially horizontal region of the injection well is at least partially immersed, is immersed, is completely immersed, is at least partially covered, is covered, and/or is completely covered by the chamber liquid and/or within the chamber liquid pool.

Stated another way, the accumulating at 125 may include accumulating such that the at least substantially horizontal region of the injection well is below, or is a threshold distance below, an upper surface of the chamber liquid pool. Examples of the threshold distance include threshold distances of at least 0.5 meters, at least 1 meter, at least 2 meters, at least 3 meters, at least 4 meters, at most 8 meters, at most 6 meters, and/or at most 4 meters.

The accumulating at 125 may be accomplished in any suitable manner. As an example, methods 100 may include ceasing the producing at 160, such as to bring about, or facilitate, the accumulating at 125. As another example, methods 100 may include regulating a production rate of a produced chamber liquid that is produced during the producing at 155 to bring about, or facilitate, the accumulating at 125. As a more specific example, the accumulating at 125 may include increasing the production rate of the produced chamber liquid responsive to the upper surface of the chamber liquid pool being above, or being greater than the threshold distance above, the at least substantially horizontal region of the injection well. As another more specific example, the accumulating at 125 may include decreasing the production rate of the produced chamber liquid responsive to the upper surface of the chamber liquid pool being below, or being less than the threshold distance above, the at least substantially horizontal region of the injection well.

Figure 6:
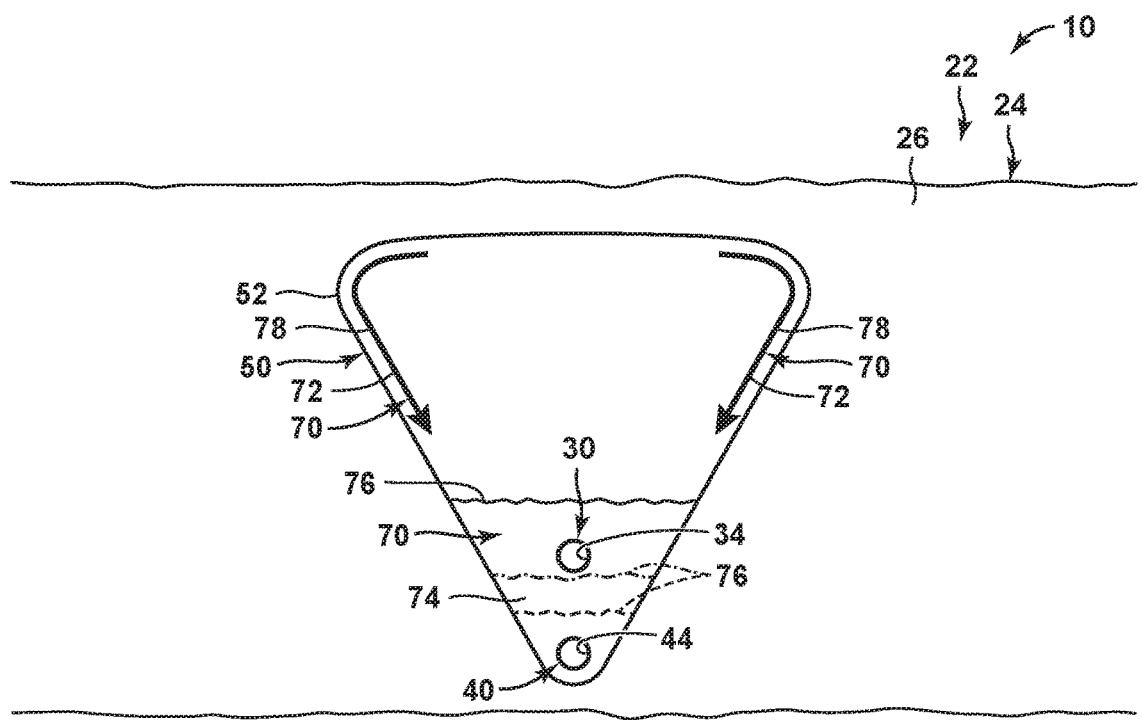
FIG. 6 is a schematic transverse cross-sectional view of a heated chamber illustrating a portion of the method of FIG. 4.

The accumulating at 125 is schematically illustrated in FIG. 6. As illustrated therein, the accumulating at 125 may include accumulating chamber liquid 70 within heated chamber 50 such that the at least substantially horizontal region of injection well 30 is immersed within the chamber liquid and/or within a chamber liquid pool 74. The accumulating at 125 is illustrated in FIG. 6 by the progression from an upper surface 76 of chamber liquid pool 74 being below injection well 30, as illustrated in dashed lines, to the upper surface of the chamber liquid pool approaching the injection well, as illustrated in dash-dot lines, to the upper surface of the chamber liquid pool being above the injection well, as illustrated in solid lines.

Monitoring the liquid level variable at 130 may include monitoring any suitable liquid level variable that may be associated with and/or indicative of a location of the upper surface of the chamber liquid pool within the heated chamber. When methods 100 include the monitoring at 130, the accumulating at 125 may be performed based, at least in part, on the liquid level variable. As an example, the accumulating at 125 may include increasing a height of a liquid level of the chamber liquid pool and/or a depth of the chamber liquid pool, within the heated chamber, until the monitoring at 130 indicates that the at least substantially horizontal region of the injection well is immersed within the chamber liquid. Examples of the liquid level variable include one or more of a pressure within the heated chamber, a pressure differential within the heated chamber, a pressure differential between the injection well and the production well, a pressure differential between two different depths within the heated chamber, a temperature within the heated chamber, a temperature differential within the heated chamber, a production temperature of the produced fluid stream, a temperature differential between a temperature of the heated solvent vapor stream and a temperature of the produced fluid stream, a temperature differential between the temperature of the produced fluid stream and a bubble point temperature of the heated solvent vapor stream, a temperature differential between the temperature of the produced fluid stream and a dew point temperature of the heated solvent vapor stream, a comparison between the temperature within the heated chamber and an estimated bubble point temperature of the chamber liquid, a change in a production temperature of mobilized viscous hydrocarbons, the production temperature of the mobilized viscous hydrocarbons, and/or a water-to-hydrocarbon ratio within the produced chamber liquid.

Ceasing injection of the heated solvent vapor stream at 135 may be performed with any suitable timing within methods 100 and/or in any suitable manner. As an example, the ceasing at 135 may include ceasing injection of the heated solvent vapor stream subsequent to the heated solvent vapor injection time period and/or subsequent to performing the injecting at 110 for the heated solvent vapor injection time period. As another example, the ceasing at 135 may include ceasing injection of the heated solvent vapor stream prior to the steam injection time period and/or prior to initiation of the injecting at 140.

Injecting the steam stream at 140 may include injecting the steam stream via the at least substantially horizontal region of the injection well and/or into the heated chamber. The injecting at 140 may include injecting the steam stream subsequent to performing the injecting at 110, injecting the steam stream subsequent to the heated solvent vapor injection time period, and/or injecting the steam stream for a steam injection time period.

It is within the scope of the present disclosure that the injecting at 140 may include vaporizing, or injecting the steam stream to vaporize, at least a fraction of the condensed solvent that is present within the heated chamber. Additionally or alternatively, the injecting at 140 may include vaporizing, or injecting the steam stream to vaporize, at least a fraction of the chamber liquid that may extend within the heated chamber and/or that may define the chamber liquid pool. This may include vaporizing the condensed solvent and/or the chamber liquid to produce and/or generate vaporized solvent.

As discussed herein, the heated chamber may include and/or define an interface region that extends between the heated chamber and a remainder of the subterranean formation. Under these conditions, the injecting at 140 may include injecting the steam stream to facilitate, or provide a motive force for, flow of the heated solvent vapor stream and/or the vaporized solvent toward and/or into contact with the interface region.

Figure 7:
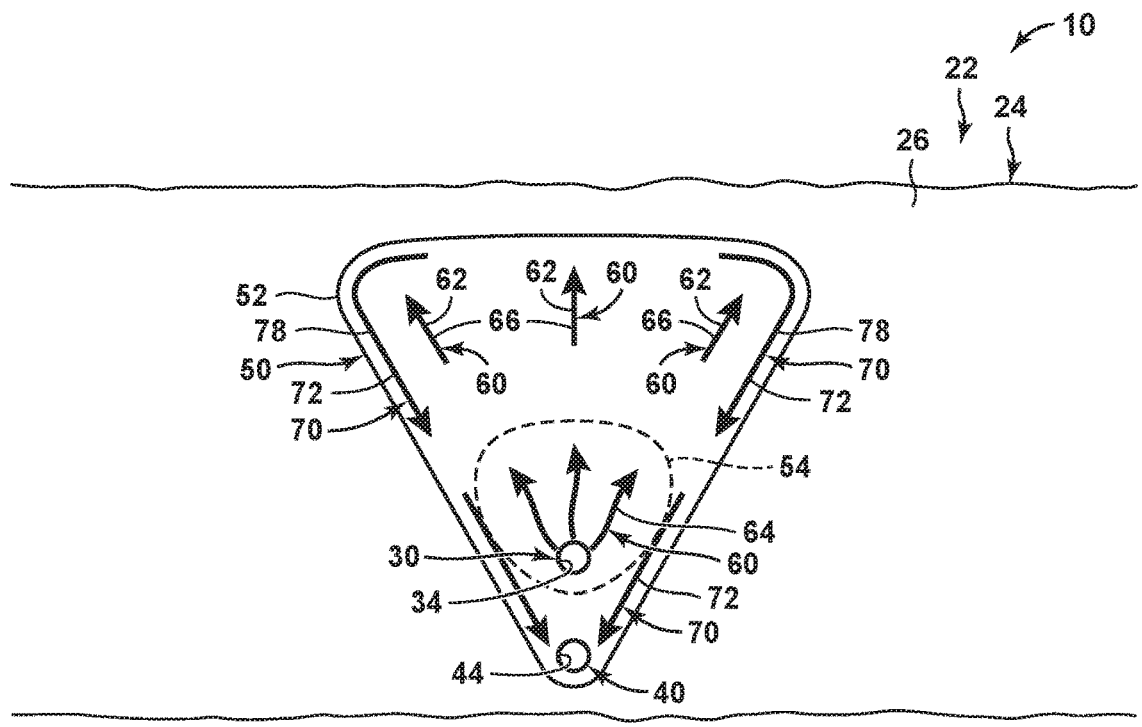
FIG. 7 is a schematic transverse cross-sectional view of a heated chamber illustrating a portion of the method of FIG. 4.

This is illustrated schematically in FIG. 7. As illustrated therein, injection of a steam stream 64 into heated chamber 50 via injection well 30 may increase a pressure within a region 54 of heated chamber 50 that is proximal to injection well 30 and/or may vaporize condensed solvent within region 54. This increased pressure may cause heated solvent vapor stream 62 and/or vaporized solvent 66 to flow toward interface region 52, thereby increasing an effectiveness of the injected solvent in recovering viscous hydrocarbons 26 from the subterranean formation. Additionally or alternatively, the injecting at 140 may include flushing condensed solvent 78 from heated chamber 50, facilitating flow of the condensed solvent from the heated chamber, and/or facilitating condensation of the heated solvent vapor stream within the interface region. As discussed herein, the steam injection time may be selected such that region 54 does not extend into contact with interface region 52 and/or such that injected solvent, in the form of heated solvent vapor stream 62, vaporized solvent 66, and/or condensed solvent 78, contacts interface region 52 to a greater extent when compared to steam stream 64.

When methods 100 include the accumulating at 125, the injecting at 140 additionally or alternatively may include injecting, or initiating the injecting, subsequent to the accumulating at 125 and/or subsequent to the at least substantially horizontal region of the injection well being immersed within the chamber liquid. Stated another way, the accumulating at 125 may be performed prior to the injecting at 140. Under these conditions, the injecting at 140 may include injecting such that the steam stream contacts, directly contacts, flows through, and/or bubbles through at least a region of the chamber liquid pool. Additionally or alternatively, the injecting at 140 may include injecting such that the steam stream vaporizes at least a fraction of the chamber liquid, such as the condensed solvent, from the chamber liquid pool. When methods 100 include the accumulating at 125, methods 100 further may include maintaining the at least substantially horizontal region of the injection well immersed within the chamber pool during the injecting at 140, during the steam injection time period, during at least a substantial fraction of the steam injection time period, during a majority of the steam injection time period, and/or during an entirety of the steam injection time period.

Figure 8:
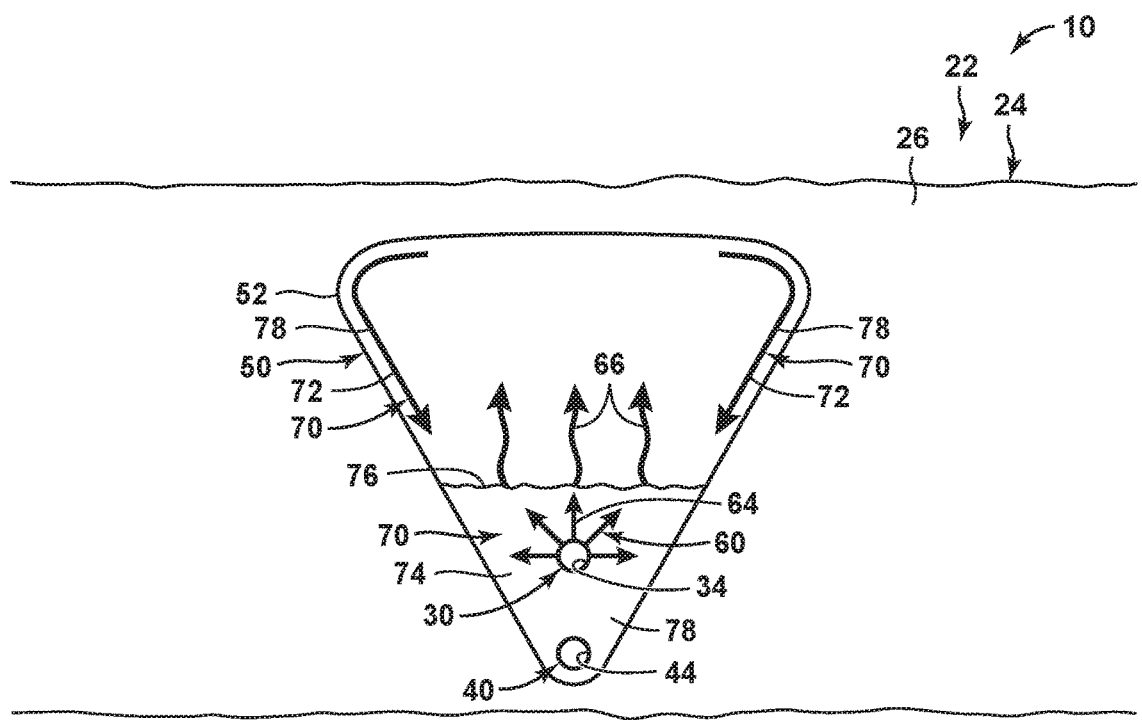
FIG. 8 is a schematic transverse cross-sectional view of a heated chamber illustrating a portion of the method of FIG. 4.

This is illustrated schematically in FIG. 8. As illustrated therein, injection well 30 may be immersed within chamber liquid pool 74 during the injecting at 140. As such, the injecting at 140 may include contacting steam stream 64 with chamber liquid 70 within chamber liquid pool 74. This contact between the steam stream and the chamber liquid may facilitate thermal energy transfer from the steam stream to the chamber liquid, vaporization of condensed solvent 78 from the chamber liquid, and/or generation of vaporized solvent 66.

It is within the scope of the present disclosure that methods 100 may transition between the injecting at 110 to the injecting at 140 based upon any suitable criteria. As an example, the heated solvent vapor injection time period may be a predetermined, or fixed, heated solvent vapor injection time period. Under these conditions, methods 100 may transition from the injecting at 110 to the injecting at 140 subsequent to, or subsequent to expiration of, the heated solvent vapor injection time period.

Additionally or alternatively, the heated solvent vapor injection time period may be determined and/or established based, at least in part, upon one or more properties and/or variables that may be determined and/or measured during methods 100. Stated another way, methods 100 may transition from the injecting at 110 to the injecting at 140 based, at least in part, on the one or more properties and/or variables. Examples of the one or more properties and/or variables include a change in a production rate of mobilized viscous hydrocarbons from the subterranean formation during the producing at 155; in the production rate, or a magnitude of the production rate, of the mobilized viscous hydrocarbons; in a concentration of solvent in the mobilized viscous hydrocarbons produced from the subterranean formation; in the concentration, or a magnitude of the concentration, of the solvent, and/or in a temperature within the heated chamber.

The steam injection time period may have any suitable duration. As examples, the steam injection time period may be at least 0.1 days, at least 0.25 days, at least 0.5 days, at least 0.75 days, at least 1 day, at least 1.5 days, at least 2 days, at least 3 days, at least 4 days, at least 5 days, at least 6 days, at least 8 days, at least 10 days, and/or at least 15 days. Additionally or alternatively, the steam injection time period may be at most 15 days, at most 10 days, at most 8 days, at most 6 days, at most 5 days, at most 4 days, at most 3 days, at most 2 days, and/or at most 1 day.

Additionally or alternatively, the heated solvent vapor injection time period and the steam injection time period may have any suitable relative magnitude. As an example, method 100 may define an injection time ratio of the heated solvent vapor injection time period to the steam injection time period. Examples of the injection time ratio include injection time ratios of at least 1, at least 2, at least 3, at least 4, at least 5, at least 6, at least 8, at least 10, at least 15, at least 20, at least 25, at least 30, at least 40, and/or at least 50. Additionally or alternatively, the injection time ratio may be at most 100, at most 80, at most 60, at most 50, at most 40, at most 30, at most 25, at most 20, at most 15, and/or at most 10. The injection time ratio may be selected to prevent, or to decrease a potential for, fluid contact between the steam stream and the interface region.

Additionally or alternatively, methods 100 may define an injection mass ratio. As an example, the injecting at 110 may include injecting a mass of heated solvent vapor, the injecting at 140 may include injecting a mass of steam, and the injection mass ratio may be a ratio of the mass of heated solvent vapor to the mass of steam. The injecting at 110 and the injecting at 140 may be performed such that the injection mass ratio has any suitable value, or magnitude. As examples, the injection mass ratio may be at least 1, at least 1.25, at least 1.5, at least 2, at least 3, at least 4, at least 6, at least 8, at least 10, at least 12.5, at least 15, at least 20, at least 25, and/or at least 30. Additionally or alternatively, the injection mass ratio may be at most 100, at most 80, at most 60, at most 50, at most 40, at most 30, at most 25, at most 20, at most 15, and/or at most 10.

The injecting at 140 may include injecting a steam stream with any suitable composition. As an example, the steam stream may include, may consist of, and/or may consist essentially of steam and/or water. As another example, the steam stream may include, have, and/or define at least a threshold fraction of steam. Examples of the threshold fraction of steam include threshold fractions of at least 51 wt %, at least 60 wt %, at least 70 wt %, at least 80 wt %, at least 90 wt %, at least 95 wt %, and/or at least 99 wt %. Ceasing injection of the steam stream at 145 may include ceasing supply of the steam stream to the subterranean formation and/or to the heated chamber via the injection well. Stated another way, the ceasing at 145 may include ceasing the injecting at 140.

The ceasing at 145 may be performed subsequent to the steam injection time period and/or prior to the repeating at 180. Stated another way, and within a given injection cycle of the plurality of injection cycles, the ceasing at 145 may be performed prior to performing the injecting at 110 for a subsequent injection cycle of the plurality of injection cycles.

Draining mobilized viscous hydrocarbons at 150 may include draining the mobilized viscous hydrocarbons under the influence of gravity. This may include draining the mobilized viscous hydrocarbons toward and/or into a lower region of the heated chamber that includes the at least substantially horizontal region of the production well. Additionally or alternatively, the draining at 150 may include draining the mobilized viscous hydrocarbons toward and/or into the production well. This is illustrated schematically in FIGS. 5-8, with the arrows indicating drainage of chamber liquid 70, including mobilized viscous hydrocarbons 72 thereof, toward production well 40.

Producing the produced fluid stream at 155 may include producing the chamber liquid, the mobilized viscous hydrocarbons, and/or the condensed solvent from the heated chamber and/or from the subterranean formation. This may include producing with, via, and/or utilizing the production well, or the at least substantially horizontal region of the production well. The chamber liquid may be produced from the subterranean formation as a produced chamber liquid. Similarly, the mobilized viscous hydrocarbons may be produced from the subterranean formation as produced mobilized viscous hydrocarbons, and/or the condensed solvent may be produced from the subterranean formation as produced condensed solvent.

The producing at 155 may be performed with any suitable timing and/or sequence during methods 100. As an example, the producing at 155 may be performed during at least one injection cycle of the plurality of injection cycles. As another example, the producing at 155 may be performed during each injection cycle of the plurality of injection cycles. As yet another example, the producing at 155 may be performed during at least a portion of the heated solvent vapor injection time period, during an entirety of the heated solvent vapor injection time period, during the injecting at 110, during the fluidly contacting at 115, during at least a portion of the steam injection time period, during an entirety of the steam injection time period, and/or during the injecting at 140. Stated another way, it is within the scope of the present disclosure that methods 100 may include continuously performing the producing at 155 or intermittently performing the producing at 155. When methods 100 include intermittently performing the producing at 155, methods 100 may include ceasing the producing at 160 prior to the injecting at 140 and/or during the injecting at 140, such as to facilitate the accumulating at 125, when performed.

As discussed herein, the at least substantially horizontal region of the production well may extend within the heated chamber and below the at least substantially horizontal region of the injection well. It is within the scope of the present disclosure that the at least substantially horizontal region of the production well and the at least substantially horizontal region of the injection well may define any suitable spacing, or average spacing, therebetween. In addition, and when methods 100 include the forming at 105, the forming at 105 may include forming such that the at least substantially horizontal region of the production well and the at least substantially horizontal region of the injection well have and/or define the average spacing. Examples of the average spacing include average spacings of at least 1 meter, at least 2 meters, at least 3 meters, at least 4 meters, at least 5 meters, at most 10 meters, at most 8 meters, at most 5 meters, at most 4 meters, at most 3 meters, and/or at most 2 meters.

Reducing the volume of chamber liquid at 165 may include reducing the volume of chamber liquid within, or that defines, the chamber liquid pool. Stated another way, the reducing at 165 may include reducing the volume of chamber liquid within the heated chamber. This may include reducing such that the at least substantially horizontal region of the injection well extends above, or is not immersed in, the chamber liquid pool.

The reducing at 165 may be performed at any suitable time and/or with any suitable sequence during methods 100. As an example, methods 100 may include performing the reducing at 165 subsequent to performing the injecting at 140. As another example, and within each injection cycle of the plurality of injection cycles, methods 100 may include performing the reducing at 165 prior to performing the injecting at 110.

Maintaining the target operating pressure at 170 may include maintaining the target operating pressure in, or within, the heated chamber. This may include performing the injecting at 110 at, or to maintain, the target operating pressure and/or performing the injecting at 140 at, or to maintain, the target operating pressure. Additionally or alternatively, the maintaining at 170 may include selectively varying a temperature of the heated solvent vapor stream and/or a temperature of the steam stream to maintain the target operating pressure within the heated chamber.

Monitoring the composition variable at 175 may include monitoring any suitable composition variable that may be associated with a solvent content of the produced chamber liquid. Examples of the composition variable include a density of the produced chamber liquid, a viscosity of the produced chamber liquid, and/or a chemical composition of the produced chamber liquid.

When methods 100 include the monitoring at 175, methods 100 also may include selectively regulating the injecting at 110 based, at least in part, on the monitoring at 175. As an example, methods 100 may include selectively regulating an injection rate of the heated solvent vapor stream based, at least in part, on the composition variable. This may include selectively increasing the injection rate of the heated solvent vapor stream responsive to a decrease in the solvent content of the produced chamber liquid and/or selectively increasing the injection rate of the heated solvent vapor stream responsive to an increase in the solvent content of the produced chamber liquid.

When methods 100 include the monitoring at 175, methods 100 also may include selectively regulating the injecting at 140 based, at least in part, on the monitoring at 175. As an example, methods 100 may include selectively regulating an injection rate of the steam stream based, at least in part, on the composition variable. This may include selectively increasing the injection rate of the steam stream responsive to an increase in the solvent content of the produced chamber liquid and/or selectively decreasing the injection rate of the steam stream responsive to a decrease in the solvent content of the produced chamber liquid.

When methods 100 include the monitoring at 175, methods 100 also may include selectively regulating the producing at 155 based, at least in part, on the monitoring at 175. As an example, methods 100 may include selectively regulating a production rate of the chamber liquid based, at least in part, on the composition variable. This may include selectively increasing the production rate of the chamber liquid to decrease the volume of chamber liquid within the heated chamber and/or selectively decreasing the production rate of the chamber liquid to increase the volume of the chamber liquid within the heated chamber.

Repeating the methods for the plurality of injection cycles at 180 may include repeating at least the injecting at 110, the fluidly contacting at 115, and the injecting at 140 during each of the plurality of injection cycles. Stated another way, methods 100 may include sequentially performing the injecting at 110, the fluidly contacting at 115, and the injecting at 140 for a plurality of distinct injection cycles.

The repeating at 180 also may include repeating the producing at 155 during each of the plurality of injection cycles.

It is within the scope of the present disclosure that methods 100 may include transition from a given injection cycle of the plurality of injection cycles to a subsequent injection cycle of the plurality of injection cycles based upon any suitable criteria. As an example, methods 100 may transition from the given injection cycle to the subsequent injection cycle responsive to completion of the injecting at 140 and/or responsive to expiration of the steam injection time period. As another example, methods 100 may include ceasing the injecting at 140, and/or transitioning from the given injection cycle to the subsequent injection cycle, responsive to the composition variable associated with the solvent content of the produced chamber liquid indicating less than a threshold solvent content within the produced chamber liquid.

It also is within the scope of the present disclosure that methods 100 may include modifying the injecting at 110 and/or the injecting at 140 in a given injection cycle of the plurality of injection cycles relative to a prior injection cycle of the plurality of injection cycles. As an example, and as discussed herein, performing methods 100 may cause the heated chamber to grow, or expand, with time. As such, and responsive to an increase in a volume of the heated chamber, methods 100 may include increasing the injection time ratio in the given injection cycle relative to the prior injection cycle. As additional examples, methods 100 may include modifying the injection time ratio in the given injection cycle relative to the prior injection cycle based, at least in part, on a change in a production rate of mobilized viscous hydrocarbons, on the production rate of mobilized viscous hydrocarbons, on a change in a concentration of solvent in the mobilized viscous hydrocarbons produced from the subterranean formation, on the concentration of the mobilized viscous hydrocarbons produced from the subterranean formation, on a temperature within the heated chamber, on a change in a production temperature of the mobilized viscous hydrocarbons, and/or on the production temperature of the mobilized viscous hydrocarbons.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

EMBODIMENTS

Additional embodiments of the invention herein are as follows:

Embodiment 1: A method for recovering viscous hydrocarbons from a subterranean formation, the method comprising:
- a plurality of injection cycles, wherein each injection cycle in the plurality of injection cycles includes:
  injecting, via an at least substantially horizontal region of an injection well and for a heated solvent vapor injection time period, a heated solvent vapor stream into a heated chamber that extends within the subterranean formation, wherein the heated solvent vapor stream includes at least 50 weight percent nonaqueous species;
  (ii) fluidly contacting the viscous hydrocarbons with the heated solvent vapor stream to generate mobilized viscous hydrocarbons within the heated chamber; and
  (iii) subsequent to the heated solvent vapor injection time period and for a steam injection time period, injecting, via the at least substantially horizontal region of the injection well, a steam stream into the heated chamber; and
- during at least one injection cycle of the plurality of injection cycles, producing the mobilized viscous hydrocarbons from the subterranean formation via an at least substantially horizontal region of a production well that extends within the heated chamber and below the at least substantially horizontal region of the injection well.

Embodiment 2: The method of embodiment 1, wherein the subterranean formation includes subterranean strata, which extend within the heated chamber, wherein the method further includes condensing the heated solvent vapor stream on the subterranean strata to generate condensed solvent, and further wherein the injecting the steam stream includes vaporizing the condensed solvent to generate vaporized solvent.

Embodiment 3: The method of any one of embodiments 1-2, wherein the subterranean formation includes an interface region, which extends between the heated chamber and a remainder of the subterranean formation, and further wherein the injecting the steam stream includes at least one of:
(i) facilitating flow of the heated solvent vapor stream into fluid contact with the interface region; and
(ii) facilitating flow of a/the vaporized solvent into fluid contact with the interface region.

Embodiment 4: The method of any one of embodiments 1-3, wherein the injecting the steam stream includes flushing condensed solvent from the heated chamber.

Embodiment 5: The method of embodiment 4, wherein the flushing includes facilitating flow of the condensed solvent from the subterranean formation via the production well.

Embodiment 6: The method of any one of embodiments 4-5, wherein the flushing includes facilitating condensation of the heated solvent vapor stream within an/the interface region that extends between the heated chamber and a remainder of the subterranean formation.

Embodiment 7: The method of any one of embodiments 1-6, wherein the method defines an injection time ratio of the heated solvent vapor injection time period to the steam injection time period.

Embodiment 8: The method of embodiment 7, wherein, during each injection cycle of the plurality of injection cycles, the injection time ratio is one of:
(i) at least 1;
(ii) at least 2
(iii) at least 3;
(iv) at least 4;
(v) at least 5;
(vi) at least 6;
(vii) at least 8;
(viii) at least 10;
(ix) at least 15;
(x) at least 20;
(xi) at least 25;
(xii) at least 30;
(xiii) at least 40; and
(xiv) at least 50.

Embodiment 9: The method of any one of embodiments 7-8, wherein the injection time ratio is at least 1 and one of:
(i) at most 100;
(ii) at most 80;
(iii) at most 60;
(iv) at most 50;
(v) at most 40;
(vi) at most 30;
(vii) at most 25;
(viii) at most 20;
(ix) at most 15; and
(x) at most 10.

Embodiment 10: The method of any one of embodiments 7-8, wherein the injection time ratio is selected to prevent fluid contact between the steam stream and an/the interface region that extends between the heated chamber and a remainder of the subterranean formation.

Embodiment 11: The method of any one of embodiments 7-10, wherein, responsive to an increase in a volume of the heated chamber, the method further includes increasing the injection time ratio in a given injection cycle of the plurality of injection cycles relative to a prior injection cycle of the plurality of injection cycles.

Embodiment 12: The method of any one of embodiments 7-11, wherein the method further includes modifying the injection time ratio for a/the given injection cycle of the plurality of injection cycles relative to a/the prior injection cycle of the plurality of injection cycles based, at least in part, on at least one of: a change in a production rate of mobilized viscous hydrocarbons;
(ii) the production rate of mobilized viscous hydrocarbons;
(iii) a change in a concentration of solvent in the mobilized viscous hydrocarbons produced from the subterranean formation;
(iv) the concentration of solvent in the mobilized viscous hydrocarbons produced from the subterranean formation;
(v) a change in a production temperature of the mobilized viscous hydrocarbons;
(vi) the production temperature of the mobilized viscous hydrocarbons; and
(vii) a temperature within the heated chamber.

Embodiment 13: The method of any one of embodiments 1-12, wherein the method further includes transitioning from the injecting the heated solvent vapor stream to the injecting the steam stream based, at least in part, on at least one of:
(i) a/the change in a production rate of mobilized viscous hydrocarbons;

(ii) the production rate of mobilized viscous hydrocarbons;
(iii) a/the change in a concentration of solvent in the mobilized viscous hydrocarbons produced from the subterranean formation;
(iv) the concentration of solvent in the mobilized viscous hydrocarbons produced from the subterranean formation;
(v) a/the change in a/the production temperature of the mobilized viscous hydrocarbons;
(vi) the production temperature of the mobilized viscous hydrocarbons; and
(vii) a/the temperature within the heated chamber.

Embodiment 14: The method of any one of embodiments 1-13, wherein the heated solvent vapor injection time period is one of:
(i) at least 0.1 days;
(ii) at least 0.25 days;
(iii) at least 0.5 days;
(iv) at least 1 day;
(v) at least 2 days;
(vi) at least 3 days;
(vii) at least 4 days;
(viii) at least 5 days;
(ix) at least 6 days;
(x) at least 8 days;
(xi) at least 10 days;
(xii) at least 15 days;
(xiii) at least 20 days;
(xiv) at least 25 days; and
(xv) at least 30 days.

Embodiment 15: The method of any one of embodiments 1-14, wherein the heated solvent vapor injection time period is at least 1 and one of:
(i) at most 45 days;
(ii) at most 40 days;
(iii) at most 35 days;
(iv) at most 30 days;
(v) at most 25 days;
(vi) at most 20 days;
(vii) at most 15 days;
(viii) at most 10 days; and
(ix) at most 5 days.

Embodiment 16: The method of any one of embodiments 1-15, wherein the steam injection time period is one of:
(i) at least 0.1 days;
(ii) at least 0.25 days;
(iii) at least 0.5 days;
(iv) at least 0.75 days;
(v) at least 1 day;
(vi) at least 1.5 days;
(vii) at least 2 days;
(viii) at least 4 days;
(ix) at least 6 days;
(x) at least 8 days; and
(xi) at least 10 days.

Embodiment 17: The method of any one of embodiments 1-16, wherein the steam injection time period is at least 1 and one of:
(i) at most 15 days;
(ii) at most 10 days;
(iii) at most 8 days;
(iv) at most 6 days;
(v) at most 5 days;
(vi) at most 4 days;
(vii) at most 3 days;
(viii) at most 2 days; and
(ix) at most 1 day.

18. The method of any one of embodiments 1-17, wherein the injecting the heated solvent vapor stream includes injecting a mass of heated solvent vapor, and further wherein the injecting the steam stream includes injecting a mass of steam.

Embodiment 19: The method of embodiment 18, wherein, during each injection cycle of the plurality of injection cycles, an injection mass ratio of the mass of heated solvent vapor to the mass of steam is one of:
(i) at least 1.0;
(ii) at least 1.25;
(iii) at least 1.5;
(iv) at least 2.0;
(v) at least 3;
(vi) at least 4;
(vii) at least 6;
(viii) at least 8;
(ix) at least 10;
(x) at least 12.5;
(xi) at least 15;
(xii) at least 20;
(xiii) at least 25; and
(xiv) at least 30.

Embodiment 20: The method of any one of embodiments 1-19, wherein the method further includes maintaining a target operating pressure within the heated chamber.

Embodiment 21: The method of embodiment 20, wherein the maintaining includes performing the injecting the heated solvent vapor stream and the injecting the steam stream at the target operating pressure.

Embodiment 22: The method of any one of embodiments 20-21, wherein the maintaining includes selectively varying at least one of a temperature of the heated solvent vapor stream and a temperature of the steam stream to maintain the target operating pressure.

Embodiment 23: The method of any one of embodiments 1-22, wherein the fluidly contacting includes condensing the heated solvent vapor stream to form a chamber liquid that includes condensed solvent and the mobilized viscous hydrocarbons, wherein the producing includes producing at least a portion of the chamber liquid as a produced chamber liquid, and further wherein: prior to the injecting the steam stream, the method includes accumulating the chamber liquid within the heated chamber to form a chamber liquid pool within the heated chamber and immersing the at least substantially horizontal region of the injection well within the chamber liquid pool; and
  (ii) initiating the injecting the steam stream subsequent to the at least substantially horizontal region of the injection well being immersed within the chamber liquid pool.

Embodiment 24: The method of embodiment 23, wherein the accumulating includes accumulating such that the at least substantially horizontal region of the injection well is completely immersed within the chamber liquid pool.

Embodiment 25: The method of any one of embodiments 23-24, wherein the accumulating includes accumulating such that the at least substantially horizontal region of the injection well is a threshold distance below an upper surface of the chamber liquid pool.

Embodiment 26: The method of embodiment 25, wherein the threshold distance is at least one of:
(i) at least 0.5 meters;
(ii) at least 1 meter;
(iii) at least 2 meters;
(iv) at least 3 meters;

(v) at least 4 meters;
(vi) at most 8 meters;
(vii) at most 6 meters; and
(viii) at most 4 meters.

Embodiment 27: The method of any one of embodiments 23-26, wherein the accumulating includes regulating a production rate of the produced chamber liquid to increase a volume of the chamber liquid within the heated chamber.

Embodiment 28: The method of embodiment 27, wherein the regulating includes at least one of:
(i) increasing the production rate of the produced chamber liquid responsive to an/the upper surface of the chamber liquid pool being above the at least substantially horizontal region of the injection well;
(ii) increasing the production rate of the produced chamber liquid responsive to the upper surface of the chamber liquid pool being greater than a/the threshold distance above the at least substantially horizontal region of the injection well; and
(iii) decreasing the production rate of the produced chamber liquid responsive to the upper surface of the chamber liquid pool being below the at least substantially horizontal region of the injection well.

Embodiment 29: The method of any one of embodiments 23-28, wherein the injecting the steam stream includes utilizing the steam stream to vaporize at least a fraction of the condensed solvent from the chamber liquid pool.

Embodiment 30: The method of any one of embodiments 23-29, wherein the method further includes monitoring a composition variable associated with a solvent content of the produced chamber liquid.

Embodiment 31: The method of embodiment 30, wherein the method further includes at least one of:
(i) selectively regulating an injection rate of the heated solvent vapor stream based, at least in part, on the composition variable; and
(ii) selectively regulating an injection rate of the steam stream based, at least in part, on the composition variable.

Embodiment 32: The method of any one of embodiments 30-31, wherein the monitoring the composition variable includes at least one of:
(i) monitoring a density of the produced chamber liquid;
(ii) monitoring a viscosity of the produced chamber liquid; and
(iii) monitoring a chemical composition of the produced chamber liquid.

Embodiment 33: The method of any one of embodiments 23-32, wherein the method further includes monitoring a liquid level variable associated with a location of an/the upper surface of the chamber liquid pool within the heated chamber, and further wherein the accumulating is based, at least in part, on the liquid level variable.

Embodiment 34: The method of embodiment 33, wherein the monitoring the liquid level variable includes at least one of:
(i) monitoring at least one pressure within the heated chamber;
(ii) monitoring a differential pressure between two different depths within the heated chamber;
(iii) monitoring at least one temperature within the heated chamber and comparing the at least one temperature to an estimated bubble point temperature of the chamber liquid;
(iv) monitoring a temperature differential within the heated chamber;
(v) monitoring a change in a production temperature of the mobilized viscous hydrocarbons;
(vi) monitoring the production temperature of the mobilized viscous hydrocarbons; and
(vii) monitoring a water-to-hydrocarbon ratio within the produced chamber liquid.

Embodiment 35: The method of any one of embodiments 23-34, wherein, during the injecting the steam stream, the method includes maintaining the at least substantially horizontal region of the injection well immersed within the chamber liquid pool.

Embodiment 36: The method of any one of embodiments 23-35, wherein, subsequent to the injecting the steam stream, the method further includes reducing a volume of chamber liquid within the heated chamber such that the at least substantially horizontal region of the injection well extends above an/the upper surface of the chamber liquid pool.

Embodiment 37: The method of embodiment 36, wherein, within each injection cycle of the plurality of injection cycles, the method includes performing the reducing the volume of chamber liquid within the heated chamber prior to the injecting the heated solvent vapor stream.

Embodiment 38: The method of any one of embodiments 23-37, wherein the heated solvent vapor injection time period is at least one of:
(i) a predetermined heated solvent vapor injection time period; and
(ii) a fixed heated solvent vapor injection time period.

Embodiment 39: The method of any one of embodiments 23-38, wherein the method includes ceasing the injecting the steam stream responsive to a/the composition variable associated with a/the solvent content of the produced chamber liquid indicating less than a threshold solvent content in the produced chamber liquid.

Embodiment 40: The method of any one of embodiments 23-39, wherein the method includes ceasing the producing at least one of:
(i) prior to the injecting the steam stream; and
(ii) during the injecting the steam stream.

Embodiment 41: The method of any one of embodiments 23-40, wherein the heated solvent vapor injection time period is one of:
(i) at least 1 day;
(ii) at least 3 days;
(iii) at least 5 days;
(iv) at least 10 days; and
(v) at least 15 days.

Embodiment 42. The method of any one of embodiments 23-41, wherein the steam injection time period is one of:
(i) at least 1 day;
(ii) at least 3 days;
(iii) at least 5 days;
(iv) at least 10 days; and
(v) at least 15 days.

Embodiment 43: The method of any one of embodiments 1-42, wherein, subsequent to the heated solvent vapor injection time period, the method further includes ceasing the injecting the heated solvent vapor stream.

Embodiment 44: The method of any one of embodiments 1-43, wherein, prior to the steam injection time period, the method further includes ceasing the injecting the heated solvent vapor stream.

Embodiment 45: The method of any one of embodiments 1-44, wherein, subsequent to the steam injection time period, the method further includes ceasing the injecting the steam stream and resuming the injecting the heated solvent vapor stream.

Embodiment 46: The method of any one of embodiments 1-45, wherein the method further includes ceasing the injecting the steam stream during a given injection cycle of the plurality of injection cycles prior to performing the injecting the heated solvent vapor stream during a subsequent injection cycle of the plurality of injection cycles.

Embodiment 47: The method of any one of embodiments 1-46, wherein the injecting the heated solvent vapor stream includes injecting such that the heated solvent vapor stream includes at least a threshold fraction of nonaqueous species.

Embodiment 48: The method of embodiment 47, wherein the threshold fraction of nonaqueous species is one of:
(i) at least 51 weight percent (wt %);
(ii) at least 60 wt %;
(iii) at least 70 wt %;
(iv) at least 80 wt %;
(v) at least 90 wt %;
(vi) at least 95 wt %; and
(vii) at least 99 wt %.

Embodiment 49: The method of any one of embodiments 1-48, wherein the heated solvent vapor stream consists essentially of solvent.

Embodiment 50: The method of any one of embodiments 1-49, wherein the heated solvent vapor stream includes at least one of:
(i) a hydrocarbon;
(ii) an alkane;
(iii) an alkene;
(iv) an alkyne;
(v) an aliphatic compound;
(vi) a naphthenic compound;
(vii) an aromatic compound;
(viii) an olefinic compound;
(ix) natural gas condensate;
(x) liquefied petroleum gas; and
(xi) a crude oil refinery stream.

Embodiment 51: The method of any one of embodiments 1-50, wherein the heated solvent vapor stream includes at least one of water and steam.

Embodiment 52: The method of any one of embodiments 1-51, wherein the heated solvent vapor stream includes a near-azeotropic mixture of a hydrocarbon solvent and water.

Embodiment 53: The method of embodiment 52, wherein a solvent molar fraction of the hydrocarbon solvent in the near-azeotropic mixture is 70%-130% of an azeotropic solvent molar fraction of the near-azeotropic mixture at a target operating pressure within the heated chamber.

Embodiment 54: The method of any one of embodiments 1-53, wherein a bubble point temperature of the heated solvent vapor stream at a/the target operating pressure within the heated chamber is less than a bubble point temperature of the steam stream at the target operating pressure within the heated chamber.

Embodiment 55: The method of any one of embodiments 1-54, wherein the injecting the heated solvent vapor stream includes injecting as part of at least one of:
(i) a heated vapor extraction process; and
(ii) an azeotropic heated vapor extraction process.

Embodiment 56: The method of any one of embodiments 1-55, wherein the injecting the steam stream includes injecting such that the steam stream includes at least a threshold fraction of steam.

Embodiment 57: The method of embodiment 56, wherein the threshold fraction of steam is one of:
(i) at least 51 weight percent (wt %);
(ii) at least 60 wt %;
(iii) at least 70 wt %;
(iv) at least 80 wt %;
(v) at least 90 wt %;
(vi) at least 95 wt %; and
(vii) at least 99 wt %.

Embodiment 58: The method of any one of embodiments 1-57, wherein the steam stream consists essentially of steam.

Embodiment 59: The method of any one of embodiments 1-58, wherein the producing the mobilized viscous hydrocarbons includes at least one of:
(i) continuously producing the mobilized viscous hydrocarbons during the method; and
(ii) intermittently producing the mobilized viscous hydrocarbons during the method.

Embodiment 60: The method of any one of embodiments 1-59, wherein the producing the mobilized viscous hydrocarbons includes one of:
(i) producing the mobilized viscous hydrocarbons during the injecting the heated solvent vapor stream;
(ii) producing the mobilized viscous hydrocarbons during the injecting the steam stream; and
(iii) producing the mobilized viscous hydrocarbons during both the injecting the heated solvent vapor stream and the injecting the steam stream.

Embodiment 61: The method of any one of embodiments 1-60, wherein the method further includes draining the mobilized viscous hydrocarbons, under the influence of gravity, at least one of:
(i) toward a lower region of the heated chamber that includes the at least substantially horizontal region of the production well; and
(ii) toward the at least substantially horizontal region of the production well.

Embodiment 62: The method of any one of embodiments 1-61, wherein the at least substantially horizontal region of the injection well and the at least substantially horizontal region of the production well define an average separation distance therebetween.

Embodiment 63: The method of embodiment 62, wherein the average separation distance is at least one of:
(i) at least 1 meter;
(ii) at least 2 meters;
(iii) at least 3 meters;
(iv) at least 4 meters;
(v) at least 5 meters;
(vi) at most 10 meters;
(vii) at most 8 meters;
(viii) at most 6 meters;
(ix) at most 5 meters;
(x) at most 4 meters;
(xi) at most 3 meters; and
(xii) at most 2 meters.

Embodiment 64: The method of any one of embodiments 1-63, wherein the method further includes at least one of:
(i) forming the injection well; and
(ii) forming the production well.

Embodiment 65: A method for recovering viscous hydrocarbons from a subterranean formation, the method comprising:
injecting, via an at least substantially horizontal region of an injection well, a heated solvent vapor stream into a heated chamber that extends within the subterranean formation;

fluidly contacting the viscous hydrocarbons with the heated solvent vapor stream and condensing the heated solvent vapor stream to generate mobilized viscous hydrocarbons within the heated chamber and to form a chamber liquid that includes condensed solvent and the mobilized viscous hydrocarbons;

accumulating the chamber liquid to form a chamber liquid pool within the heated chamber and to immerse the at least substantially horizontal region of the injection well within the chamber liquid pool;

subsequent to the accumulating, injecting, via the at least substantially horizontal region of the injection well, a steam stream into the heated chamber such that the steam stream directly contacts at least a region of the chamber liquid pool and vaporizes a fraction of the chamber liquid from the chamber liquid pool;

during at least one of the injecting the heated solvent vapor stream, the fluidly contacting, and the injecting the steam stream, producing at least a portion of the chamber liquid, as a produced chamber liquid, from the subterranean formation via an at least substantially horizontal region of a production well that extends within the heated chamber and below the at least substantially horizontal region of the injection well; and sequentially repeating, for a plurality of injection cycles, the injecting the heated solvent vapor steam, the fluidly contacting, the injecting the steam stream, and the producing.

Embodiment 66: The method of embodiment 65, wherein the sequentially repeating, for a plurality of injection cycles, includes the accumulating.

Embodiment 67: The method of embodiment 65 in combination with any suitable step of any of the methods of any of claims 1-64.

INDUSTRIAL APPLICABILITY

The methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for recovering viscous hydrocarbons from a subterranean formation, the method comprising:
   a plurality of injection cycles, wherein each injection cycle in the plurality of injection cycles includes:
   (i) injecting, via an at least substantially horizontal region of an injection well and for a heated solvent vapor injection time period, a heated solvent vapor stream into a heated chamber that extends within the subterranean formation, wherein the heated solvent vapor stream includes at least 50 weight percent nonaqueous species;
   (ii) fluidly contacting the viscous hydrocarbons with the heated solvent vapor stream to generate mobilized viscous hydrocarbons within the heated chamber; and
   (iii) subsequent to the heated solvent vapor injection time period and for a steam injection time period, injecting, via the at least substantially horizontal region of the injection well, a steam stream into the heated chamber; and
   during at least one injection cycle of the plurality of injection cycles, producing the mobilized viscous hydrocarbons from the subterranean formation via an at least substantially horizontal region of a production well that extends within the heated chamber and below the at least substantially horizontal region of the injection well; and
   wherein the method defines an injection time ratio of the heated solvent vapor injection time period to the steam injection time period, and the injection time ratio is selected to prevent fluid contact between the steam stream and an interface region that extends between the heated chamber and a remainder of the subterranean formation.

2. The method of claim 1, wherein the subterranean formation includes subterranean strata, which extend within the heated chamber, wherein the method further includes condensing the heated solvent vapor stream on the subterranean strata to generate condensed solvent, and further wherein the injecting the steam stream includes vaporizing the condensed solvent to generate vaporized solvent.

3. The method of claim 2, wherein the subterranean formation includes the interface region, which extends between the heated chamber and a remainder of the subterranean formation, and further wherein the injecting the steam stream includes at least one of:
   (i) facilitating flow of the heated solvent vapor stream into fluid contact with the interface region; and
   (ii) facilitating flow of a/the vaporized solvent into fluid contact with the interface region.

4. The method of claim 3, wherein the injecting the steam stream includes flushing condensed solvent from the heated chamber, and the flushing includes facilitating flow of the condensed solvent from the subterranean formation via the production well.

5. The method of claim 4, wherein the flushing includes facilitating condensation of the heated solvent vapor stream within the interface region that extends between the heated chamber and the remainder of the subterranean formation.

6. The method of claim 5, wherein, responsive to an increase in a volume of the heated chamber, the method further includes increasing the injection time ratio in a given injection cycle of the plurality of injection cycles relative to a prior injection cycle of the plurality of injection cycles.

7. The method of claim 5, wherein the method further includes modifying the injection time ratio for a/the given injection cycle of the plurality of injection cycles relative to a/the prior injection cycle of the plurality of injection cycles based, at least in part, on at least one of:
(i) a change in a production rate of mobilized viscous hydrocarbons;
(ii) the production rate of mobilized viscous hydrocarbons;
(iii) a change in a concentration of solvent in the mobilized viscous hydrocarbons produced from the subterranean formation;
(iv) the concentration of solvent in the mobilized viscous hydrocarbons produced from the subterranean formation;
(v) a change in a production temperature of the mobilized viscous hydrocarbons;
(vi) the production temperature of the mobilized viscous hydrocarbons; and
(vii) a temperature within the heated chamber.

8. The method of claim 5, wherein the method further includes transitioning from the injecting the heated solvent vapor stream to the injecting the steam stream based, at least in part, on at least one of:
(i) a/the change in a production rate of mobilized viscous hydrocarbons;
(ii) the production rate of mobilized viscous hydrocarbons;
(iii) a/the change in a concentration of solvent in the mobilized viscous hydrocarbons produced from the subterranean formation;
(iv) the concentration of solvent in the mobilized viscous hydrocarbons produced from the subterranean formation;
(v) a/the change in a/the production temperature of the mobilized viscous hydrocarbons;
(vi) the production temperature of the mobilized viscous hydrocarbons; and
(vii) a/the temperature within the heated chamber.

9. The method of claim 5, wherein the injecting the heated solvent vapor stream includes injecting a mass of heated solvent vapor, and further wherein the injecting the steam stream includes injecting a mass of steam.

10. The method of claim 9, wherein, during each injection cycle of the plurality of injection cycles, an injection mass ratio of the mass of heated solvent vapor to the mass of steam is one of:
(i) at least 1.0;
(ii) at least 1.25;
(iii) at least 1.5;
(iv) at least 2.0;
(v) at least 3;
(vi) at least 4;
(vii) at least 6;
(viii) at least 8;
(ix) at least 10;
(x) at least 12.5;
(xi) at least 15;
(xii) at least 20;
(xiii) at least 25; and
(xiv) at least 30.

11. The method of claim 5, wherein the method further includes maintaining a target operating pressure within the heated chamber by the injecting the heated solvent vapor stream and the injecting the steam stream at the target operating pressure.

12. The method of claim 11, wherein the maintaining includes selectively varying at least one of a temperature of the heated solvent vapor stream and a temperature of the steam stream to maintain the target operating pressure.

13. The method of claim 5, wherein the heated solvent vapor stream includes a near-azeotropic mixture of a hydrocarbon solvent and water; wherein a solvent molar fraction of the hydrocarbon solvent in the near-azeotropic mixture is 70%-130% of an azeotropic solvent molar fraction of the near-azeotropic mixture at a target operating pressure within the heated chamber.

14. The method of claim 13, wherein a bubble point temperature of the heated solvent vapor stream at a/the target operating pressure within the heated chamber is less than a bubble point temperature of the steam stream at the target operating pressure within the heated chamber.

15. The method of claim 1, wherein the fluidly contacting includes condensing the heated solvent vapor stream to form a chamber liquid that includes condensed solvent and the mobilized viscous hydrocarbons, wherein the producing includes producing at least a portion of the chamber liquid as a produced chamber liquid, and further wherein:
(i) prior to the injecting the steam stream, the method includes accumulating the chamber liquid within the heated chamber to form a chamber liquid pool within the heated chamber and immersing the at least substantially horizontal region of the injection well within the chamber liquid pool; and
(ii) initiating the injecting the steam stream subsequent to the at least substantially horizontal region of the injection well being immersed within the chamber liquid pool.

16. The method of claim 15, wherein the accumulating includes accumulating such that the at least substantially horizontal region of the injection well is completely immersed within the chamber liquid pool.

17. The method of claim 16, wherein the accumulating includes accumulating such that the at least substantially horizontal region of the injection well is a threshold distance below an upper surface of the chamber liquid pool, wherein the threshold distance is at least one of:
(i) at least 0.5 meters;
(ii) at least 1 meter;
(iii) at least 2 meters;
(iv) at least 3 meters;
(v) at least 4 meters;
(vi) at most 8 meters;
(vii) at most 6 meters; and
(viii) at most 4 meters.

18. The method of claim 15, wherein the accumulating includes regulating a production rate of the produced chamber liquid to increase a volume of the chamber liquid within the heated chamber.

19. The method of claim 18, wherein the regulating includes at least one of:
(i) increasing the production rate of the produced chamber liquid responsive to an/the upper surface of the chamber liquid pool being above the at least substantially horizontal region of the injection well;
(ii) increasing the production rate of the produced chamber liquid responsive to the upper surface of the chamber liquid pool being greater than a/the threshold distance above the at least substantially horizontal region of the injection well; and
(iii) decreasing the production rate of the produced chamber liquid responsive to the upper surface of the chamber liquid pool being below the at least substantially horizontal region of the injection well.

20. The method of claim 15, wherein the method further includes monitoring a composition variable associated with a solvent content of the produced chamber liquid, wherein the method further includes at least one of:
(i) selectively regulating an injection rate of the heated solvent vapor stream based, at least in part, on the composition variable; and
(ii) selectively regulating an injection rate of the steam stream based, at least in part, on the composition variable; and the monitoring the composition variable includes at least one of:
(i) monitoring a density of the produced chamber liquid;
(ii) monitoring a viscosity of the produced chamber liquid; and
(iii) monitoring a chemical composition of the produced chamber liquid.

21. The method of claim 20, wherein the method further includes monitoring a liquid level variable associated with a location of an/the upper surface of the chamber liquid pool within the heated chamber, and further wherein the accumulating is based, at least in part, on the liquid level variable; and the monitoring the liquid level variable includes at least one of:
(i) monitoring at least one pressure within the heated chamber;
(ii) monitoring a differential pressure between two different depths within the heated chamber;
(iii) monitoring at least one temperature within the heated chamber and comparing the at least one temperature to an estimated bubble point temperature of the chamber liquid;
(iv) monitoring a temperature differential within the heated chamber;
(v) monitoring a change in a production temperature of the mobilized viscous hydrocarbons;
(vi) monitoring the production temperature of the mobilized viscous hydrocarbons; and
(vii) monitoring a water-to-hydrocarbon ratio within the produced chamber liquid.

22. A method for recovering viscous hydrocarbons from a subterranean formation, the method comprising:
injecting, via an at least substantially horizontal region of an injection well, a heated solvent vapor stream into a heated chamber that extends within the subterranean formation;
fluidly contacting the viscous hydrocarbons with the heated solvent vapor stream and condensing the heated solvent vapor stream to generate mobilized viscous hydrocarbons within the heated chamber and to form a chamber liquid that includes condensed solvent and the mobilized viscous hydrocarbons;
accumulating the chamber liquid to form a chamber liquid pool within the heated chamber and to immerse the at least substantially horizontal region of the injection well within the chamber liquid pool;
subsequent to the accumulating, injecting, via the at least substantially horizontal region of the injection well, a steam stream into the heated chamber such that the steam stream directly contacts at least a region of the chamber liquid pool and vaporizes a fraction of the chamber liquid from the chamber liquid pool;
during at least one of the injecting the heated solvent vapor stream, the fluidly contacting, and the injecting the steam stream, producing at least a portion of the chamber liquid, as a produced chamber liquid, from the subterranean formation via an at least substantially horizontal region of a production well that extends within the heated chamber and below the at least substantially horizontal region of the injection well; and
sequentially repeating, for a plurality of injection cycles, the injecting the heated solvent vapor steam, the fluidly contacting, the injecting the steam stream, and the producing; and
wherein the method defines an injection time ratio of the heated solvent vapor injection time period to the steam injection time period, and the injection time ratio is selected to prevent fluid contact between the steam stream and an interface region that extends between the heated chamber and a remainder of the subterranean formation.

23. The method of claim 22, wherein the sequentially repeating, for a plurality of injection cycles, includes the accumulating.

* * * * *